US011238187B2

(12) United States Patent
Nikolayev et al.

(10) Patent No.: US 11,238,187 B2
(45) Date of Patent: Feb. 1, 2022

(54) SYSTEM AND METHOD FOR EVALUATION OF FLUID FLOW IN A PIPING SYSTEM

(71) Applicant: Tyco Fire Products LP, Lansdale, PA (US)

(72) Inventors: Alexander Nikolayev, Newtown, PA (US); James E. Golinveaux, Ada, MI (US); Michael Flax, Chicago, IL (US); Vitaly Kabashnikov, Minsk (BY); Michael Mahomet, Hatfield, PA (US); Valeri Mourachko, North Philadelphia, PA (US); Leonid Nikolaychik, Mequon, WI (US); Thomas Prymak, Doylestown, PA (US); Valery Popov, Minsk (BY); Andrey Bril, Minsk (BY); Valery Babenko, Minsk (BY); Valery Sosinovich, Minsk (BY)

(73) Assignee: Tyco Fire Products LP, Lansdale, PA (US)

( * ) Notice: Subject to any disclaimer, the term of this patent is extended or adjusted under 35 U.S.C. 154(b) by 311 days.

(21) Appl. No.: 16/535,212

(22) Filed: Aug. 8, 2019

(65) Prior Publication Data
US 2019/0362030 A1 Nov. 28, 2019

Related U.S. Application Data

(63) Continuation of application No. 13/722,959, filed on Dec. 20, 2012, now abandoned, which is a
(Continued)

(51) Int. Cl.
*G06F 17/50* (2006.01)
*G06F 30/00* (2020.01)
(Continued)

(52) U.S. Cl.
CPC ............. *G06F 30/00* (2020.01); *A62C 35/62* (2013.01); *G05B 17/02* (2013.01); *G06F 30/13* (2020.01);
(Continued)

(58) Field of Classification Search
CPC .......... G06F 30/00; G06F 30/13; G06F 30/20; G06F 2111/10; G06F 2113/14; G06G 7/50; G05B 17/02; A62C 35/62
See application file for complete search history.

(56) References Cited

U.S. PATENT DOCUMENTS 3,738,430 A 6/1973 Livingston
5,062,068 A 10/1991 Kondo et al.
(Continued)

FOREIGN PATENT DOCUMENTS

EP 0 209 388 1/1987

OTHER PUBLICATIONS

1998 MUFC Guidebook—Sprinklers, "Automatic Sprinkler Systems," pp. 270-307 [provided by Third Party].
(Continued)

*Primary Examiner* — Yoshihisa Ishizuka
(74) *Attorney, Agent, or Firm* — Foley & Lardner LLP

(57) ABSTRACT

A method to model a complex system of pipes. The model takes into account the physical processes in a tree-type piping system and provides for an accurate modeling of a real world tree-type piping system. In a preferred embodiment, a computer program is provided for analyzing models of dry pipe systems. The computer program includes a user interface and a computational engine. The user interface allows a model of a dry pipe system to be defined and the computational engine determines a liquid flow time through the model of the dry pipe system. The computational engine provides a verification of the liquid flow time in a model of
(Continued)

a referential dry pipe system within 20% of an actual liquid flow time in the referential dry pipe system.

19 Claims, 8 Drawing Sheets

Related U.S. Application Data continuation of application No. 12/573,013, filed on Oct. 2, 2009, now Pat. No. 8,725,457, which is a continuation of application No. 10/942,817, filed on Sep. 17, 2004, now Pat. No. 8,065,110, which is a continuation of application No. PCT/US03/15666, filed on May 20, 2003.

(60) Provisional application No. 60/408,257, filed on Sep. 6, 2002, provisional application No. 60/381,323, filed on May 20, 2002, provisional application No. 60/381,568, filed on May 20, 2002.

(51) Int. Cl.
    *A62C 35/62* (2006.01)
    *G05B 17/02* (2006.01)
    *G06F 30/13* (2020.01)
    *G06F 30/20* (2020.01)
    *G06G 7/50* (2006.01)
    *G06F 111/10* (2020.01)
    *G06F 113/14* (2020.01)

(52) U.S. Cl.
    CPC ............... *G06F 30/20* (2020.01); *G06G 7/50* (2013.01); *G06F 2111/10* (2020.01); *G06F 2113/14* (2020.01)

(56) References Cited

U.S. PATENT DOCUMENTS

| | | | |
|---|---|---|---|
| 5,414,641 A | 5/1995 | Shinoaki et al. | |
| 5,511,621 A | 4/1996 | Yao | |
| 5,550,761 A | 8/1996 | Pauchon et al. | |
| 5,592,397 A | 1/1997 | Shinoaki et al. | |
| 5,808,905 A | 9/1998 | Normann et al. | |
| 5,950,150 A * | 9/1999 | Lloyd ................ | A62C 37/50 702/183 |
| 5,971,080 A | 10/1999 | Loh et al. | |
| 5,979,475 A | 11/1999 | Satoh et al. | |
| 6,028,992 A | 2/2000 | Henriot et al. | |
| 6,165,947 A | 12/2000 | Chang et al. | |
| 6,223,140 B1 | 4/2001 | Monadjemi | |
| 6,234,030 B1 | 5/2001 | Butler | |
| 6,324,490 B1 | 11/2001 | Johansson et al. | |
| 6,359,434 B1 | 3/2002 | Winslow et al. | |
| 6,585,054 B1 | 7/2003 | Thomas et al. | |
| 6,918,545 B2 | 7/2005 | Franson et al. | |
| 6,979,362 B2 | 12/2005 | Jackson | |
| 8,065,110 B2 | 11/2011 | Golinveaux et al. | |
| 8,612,189 B2 | 12/2013 | Golinveaux et al. | |
| 2002/0009015 A1 | 1/2002 | Laugharn et al. | |
| 2006/0142978 A1 | 6/2006 | Suenbuel et al. | |
| 2010/0174516 A1 | 7/2010 | Nikolayev et al. | |
| 2010/0299122 A1 | 11/2010 | Golinveaux et al. | |

OTHER PUBLICATIONS

Accutech 2000 Pty Ltd, Fluid Flow and Engineering Software: Application Note No. 1 & Consulting (2000, 2006) [online] [retrieved by Third Party on May 3, 2006] Retrieved from the Source. http://www.accutech2000.com.au/Support_FF/Comparison. html & http://www.accutech2000.com.au/Consulting/Project%20Services. html.

Accutech 2000 Pty Ltd, Fluid Flow and Engineering Software: Application Note No. 1 (2000, 2006, 2007) [online] [retrieved on Mar. 20, 2017] Retrieved from the internet:<URL: http://www. accutech2000.com.au/Support_FF/Comparison.html>.

Accutech 2000 Pty Ltd, Fluid Flow and Engineering Software: Home Page & Software Selector (2000, 2006, 2007) [online] [retrieved on Apr. 20, 2007] Retrieved from the Internet:<URL: http://www.accutech2000.com.au/> & <http://www.accutech2000. com.au/Selector.html>.

Accutech 2000 Pty Ltd, Fluid Flow and Engineering Software: Piping Systems Fluid Flow & Application Note: Fixed fire protection & booster/spray sprinkler design (2000, 2006, 2007) [online] [retrieved on Apr. 20, 2007); Retrieved from the Internet:<URL: http:/ /www. accutech2000. com. au/Flu id Flow/Introduction. html>; <http://www. accutech2000. com. au/ Applications/Fixed Fire _Intro. html> & <http:/ /www. accutech2000. com .au/ Applications/ Fixed Fire Com pare. html>.

Accutech 2000 Pty Ltd. Fluid Flow and Engineering Software: Software packages by name & descriptions of same (2000, 2006, 2007) [online] [retrieved on Apr. 20, 2007] Retrieved from the Internet:<URL:http://www.accutech2000.com.au/SoftwareByName. html> & links thereon.

Accutech 2000 Pty Ltd. Fluid Flow and Engineering Software: FLUIDFLOW, (2000, 2006, 2007) [online] [retrieved on Sep. 17, 2007] Retrieved from the Internet:<URL:http://www.accutech2000. com.au/FluidFlow3/F3 Contents.html> & links thereon.

Advanced FLU INT Topics (Version 4.5) Power Point Presentation [online] C & R Technologies (unknown), 35 pgs. [retrieved by Third Party Jun. 28, 2006] Retrieved from the Internet< URL: http://www. crtech.com/docsitraining/fluint/AdvF-Class.pdf.

Anonymous. Flat Front Propagation in SINDA/FLUINT: Line Filling Methods in Complex Networks (unknown) 8 pgs. [retrieved by Third Party Jun. 28, 2006].

Apr. 8, 2008 International Preliminary Report on Patentability for International Application No. PCT/US2006/038360 including the May 15, 2007 Written Opinion of the International Searching Authority. (4 pages).

Atkinsopht. Streamlines: Fluid Flow in Networks [online] 5 pgs. (Feb. 13, 2005) retrieved by Third Party on Mar. 16, 2005] Retrieved from the Internet:<URL: http://www atkinsopht.com/eng/strmlins. htm>.

B. Karney and D. McInnis; Efficient Calculation of Transient Flow in Simple Pipe Networks; Journal of Hydraulic Engineering, Jul. 1992; pp. I O 14 1030; vol. 118, No. 7; Toronto, Canada.

Bahr, Robert W., Acting Associate Commissioner for Patent Examination Policy; Memorandum entitled "Interim Guidance for Determining Subject Matter Eligibility for Process Claims in view of Bilski v. Kappas", foly 27, 2010; 10 pages.

Brent A. Cullimore & David A. Johnson. Control Volume Interfaces: A Unique Tool for a Generalized Fluid Network Modeler. American Institute of Aeronautics and Astronautics (AIAA) Thermophysics Conference 2000. 9 pgs. [retrieved on Jan. 22, 2008] Retrieved from the Internet:<URL: http://www.crtech.com/ docs/papers/ifaces.pdf>.

Brent A. Cullimore & Jane Baumann Steady State and Transient Loop Heat Pipe Modeling. Society of Automotive Engineers 2000. 9 pgs. [retrieved on Jan. 22, 2008] Retrieved from the Internet<URL: http://www.crtech com/docs/papers/lhp.pdf>.

Brent A. Cullimore. Optimization, Data Correlation, and Parametric Analysis Features in SINDA/FLUINT 4.0. 28th Intn'l; Conference on Environmental Systems Jul. 13-16, 1998. SAE Technical Paper Series, SAE International. 10 pgs. [retrieved on Jan. 22, 2008] Retrieved from the Internet<URL: http://www.crtech.com/docs/ papers/sf981574.pdf>.

Bruce R. Munson, Donald F. Young & Theodore H. Okiishi, Fundamentals of Fluid Mechanics, p. 481 (4th ed.) [retrieved by Third Party].

Bruce R. Munson, Donald F. Young & Theodore H. Okiishi, Fundamentals of Fluid Mechanics. Ch. 8: "Viscous Flow in Pipes," pp. 443-531. (4th ed. 2002), John Wiley & Sons.

(56) References Cited

OTHER PUBLICATIONS

C & R Technologies Introduction to FLUINT. Tutorial [online] 41 pgs. (v4.7 Rev. 0 Oct. 20, 2004) [retrieved by Third Party Jun. 28, 2006] Retrieved from the Internet:<URL: http://www.crtech.com/docs/tutorials/fluint_intro.pdf>.
C & R Technologies. SINDA/FLUINT: Version 5.0. User's Manual (2006) (Patch 3 Updated Feb. 2007) [retrieved Oct. 21, 2007] pp. i-lviii; 1-1 to 1-22; 3-1 to 3-434; 5-1 to 5-114; Appen. E & Index. Retrieved from the Internet <URL:http://www.crtech.com/docs/manuals/sf50main.pdf>.
C&R Technologies. Products—SINDA/FLUINT—Two Phase Flow [online] (1999-2007) [retrieved Jan. 22, 2008] Retrieved from the Internet<URL: http://www.crtech.com/twoPhase.html>.
C&R Technologies. Re: Flat front two-phase (fill-purge simulations). (C&R User Community) [online], Nov. 28, 2007 [retrieved on Jan. 22, 2008] Retrieved from the Internet<URL: http://www.crtech.com/forum/viewtopic.php?p=965&sid=c1c96a0ebcddff7fc6ebbfc5eb332a8b>.
C&R Technologies. SINDA/FLUINT Version 4.8 Training Notes, [online] 99 pgs. [retrieved Jan. 22, 2008] Retrieved from the Internet<URL: http//www.crtech.com/docs/training/sinda/sclass.pdf>.
Communication pursuant to Article 94(3) issued in European Application No. 03 729 004.6, dated May 28, 2013 (9 pages).
Communication Re: Supplementary European Search Report; EP Application 03729004.6-1225; dated May 23, 2007 (4 pages).
Communication Re: Supplementary European Search Report; EP Application No. 1215 8454, dated Jun. 6, 2012 (4 pages).
David Halliday, Robert Resnick with the assistance of W Farrell Edwards and John Merrill; Fundamentals of Physics, Ch. 21 • Kinetic Theory of Gases, pp. 407-432, (2nd ed. 1970, 1974, 1981 and 1986), John Wiley & Sons, Inc.
David Halliday, Robert Resnick with the assistance of W. Farrell Edwards and John Merrill; Fundamentals of Physics, p. 408-409 (2nd ed. 1970, 1974, 1981 and 1986), Revised Printing [retrieved by Third Party].
David J. LeBlanc, Dry Pipe Sprinkler Systems—Effect of Geometric Parameters on Expected Number of Sprinkler Operations, 69 pages, (Sep. 2001, Tyco Fire Products) [provided by Third Party].
Dow, "Algorithms for integrated calculation models and drafting in building services pipework design," Computer-Aided Design, 19(9):479-484 (Nov. 1987).
Echoscan, Inc., Software Categories—Fire Sprinkler Tree System Design—Cat#HP6M [online] [retrieved Aug. 15, 2006] Retrieved from the Internet: <URL: http://www.iklimnet.com/hotelfires/firesoftware htm> and link thereon>; now available at Internet:<URL: http:?/web.archive.org/web/20060316045947/www.echoscaninc.com/product.cgi?code=SFA2TQ==>.
Ed Seykota, Friction Studies (1999) [online] [retrieved Mar. 20, 2007] Retrieved from the Internet: <URL:http://www.seykota.com/rm/friction/friction.htm>.
Ed Seykota, Friction Studies, Sections re Reynolds Number and Moody Diagram (1999) [online] [retrieved by Third Party on May 3, 2006] Retrieved from the internet: <URL: http://www.seykota.com/rm/friction/friction.htm>.
Elite Software Development, Inc. Fire—Fire Sprinkler System Design [online] (2006)(retrieved Aug. 15, 2006) Retrieved from the Internet: <URL: http://www.iklimnet.com/hotelfires/firesoftware.htm> and link thereon>; now available at Internet:<URL: http://web.archive.org/web/20060820154933/www.elitesoft.com/web/fire/elite_fire_info.html>.
Engineering Department of Crane, Ch. 1-1* "Theory of Flow In Pipe, pp. 1-1 to 1-10, Ch. 2-1 • Flow of Fluids Through Valves and Fittings," pp. 2-1 to 2-16, (1957), Crane Co , Chicaqo 5, Illinois.
Engineering Department of Crane, Flow of Fluids Through Valves, Fittings, and Pipe, Technical Paper No. 419, pp. 2-8 & 2-9 [retrieved by Third Party] CRANE, Summary of Formulas, Ch. 3 Formulas and Monograms for Flow Through Valves, Fittings, and Pipe, p. 1-2 [retrieved by Third Party].

Examination Report issued in Canadian Application No. 2,624,547, dated Apr. 8, 2013 (4 pages).
Examination Report issued in related co-pending European Application No. 03729004.6, dated Mar. 8, 2010.
Extended European Search Report issued in European Application No. 06 815 980.5, dated Feb. 7, 2013 (9 pages).
Faast Software. Fast Software: Brochure for Prospective Users [online] 10 pgs. (1998) [retrieved by Third Party on Mar. 16, 2005] Retrieved From the Internet: <URL:http://www.faast.com/fst3info.htm>.
Fire Protection Research Foundation; Review of NFPA 13 Dry System Water Delivery Provisions. Suppoliing Data Needs for NFPA Automatic Sprinkler Committees; SEC Project No. 1806119-000; Jan. 31, 2007, pp. 1-12; retrieved from the internet: URL: http//vvww.nfpa.org/assets/files/pdr/research/dry_pipe.pdf.
FireAcad, Various Products: CalcPlus, FireAcal and FireAcad [online] (1999) (updated Apr. 29, 2005) [retrieved Aug. 15, 2006] Retrieved from the Internet: <URL http://www.iklimnet.com/hotelfires/firesoftware.htm> and link thereon>; now available at Internet:<URL: http://web.archive.org/web/20060926103917/www.fireacad.com/products.htm and links thereon.
Flowmaster International Ltd. Flowmaster—Applications & Links Thereon [online] 66 pgs. (2003) [retrieved on Aug. 15, 2006] Available at Internet: <URL: http://web.archive.org/web/20060314043159/www.flowmaster.com/applications.html>.
Flowmaster USA, Inc. "Modeling A Dry Fire Sprinkler System Using Flowmaster's Priming Module," 7 pages, (Feb. 2002) [provided by Third Party].
FPE Software. Inc., "THE" Sprinkler Program 2001: Features [on line] (2002) [retrieved Aug. 15, 2006] Retrieved from the Internet, now available at Internet: URL<http://web.archive.org/web/20050405103937/http://www.fpesoftware.com/>.
Fred K. Forster, Incompressible Pipe Flow Eguations, 3 pages (May 28, 2004) [online] [retrieved by Third Party] [retrieved on Mar. 20, 2007] Retrieved from the Internet:<URL: http://facu lty.washington.edu/forster/classes/common_ material/pipe-flowequations.pdf>.
Fred K. Forster, Incompressible Pipe Flow Equations, 3 pages (May 28, 2004) [online] [retrieved by Third Party] Retrieved from the Source: pipeqs.tex.
Golinveaux James, Dry-Pipe Sprinkler Software, Apr. 2004, National Fire Protection Association, pp. 1-4, web page, http://findarticles.com/p/articles/mi_ga3737/os_200403/ai_n9381198.
Graham B. Wallis, One-dimensional Two-phase Flow, Ch. 3: "Separated Flow," pp. 43-88, Ch. 10: "Slug Flow," pp. 282-314, (1969) McGraw-Hill.
Graham B. Wallis, One-dimensional Two-phase Flow, pp. 57, 288 & 289 [retrieved by Third Party] (1969) McGraw-Hill.
Hrs Systems, Inc., An Introduction to HASS, [online] (2002) [retrieved on Aug. 15, 2006] Retrieved from the Internet, now available at Internet: URL <http://web.archive.org/web/20050305222606/www.hrssystems.com/introto.htm>.
http://web.archive.org/web/20060619114641/www.hydratecinc.com/HydraBID.htm>. Hydratec Inc., HydraCAD™ Design Software [online] (2006) [retrieved Aug. 15, 2006] Retrieved from the Internet: <URL:http://www.iklimnet.com/hotelfires/firesoftware.htm> and link thereon>; now available at Internet:<URL: http://web.archive.org/web/20060619114519/www.hydratecinc.com/HydraCAD.htm>.
Hydratec Inc., HydraBID™ Estimating Software [online] (2006) [retrieved Aug. 15, 2006] Retrieved from the Internet: <URL: http://www.iklimnet.com/hotelfires/firesoftware.htm> and link thereon>; now available at Internet:<URL: http://web.archive.org/web/20060619114641/www.hydratecinc.com/HydraBID.htm>.
Hydratec Inc., HydraCALC-Sizer™ Hydraulic Estimating Software [online] (2006)[retrieved Feb. 1, 2008] Retrieved from the Internet:<URL: http://web.archive.org/web/20060619114519/www.hydratecinc.com/HydraCAD.htm>.
Hydratec Inc., HydraCALC™ Hydraulic Estimating Software [online] (2006) [retrieved Aug. 15, 2006] Retrieved from the Internet:<URL http://www.iklimnet.com/hotelfires/firesoftware.htm> and link thereon>; now available at Internet:<URL: http://web.archive.org/web/20060619114914/www.hydratecinc.com/HydraCALCV50.htm>.

(56) References Cited

OTHER PUBLICATIONS

Hydratec Inc., HydraLIST™ Stocklisting Software [online] (2006) [retrieved Aug. 15, 2006] Retrieved from the Internet:<URL: http://www.iklimnet.com/hotelfires/firesoftware.htm> and link thereon>; now available at Internet:<URL:http://web.archive.org/web/20060619114830/www.hydratecinc.com/HydraLIST.htm>.
Hydronics Engineering, (Various) Hydronics, PayPerCalc & Hydraulics [online] (2004) (2006) (retrieved Aug. 15, 2006] Retrieved from the Internet<URL:http://www.hydronicsenq.com> and links thereon.
IKLIM. Fires & Hotels—Fire Sprinkler Design Software [online] [retrieved by Third Party on Mar. 16, 2005] Retrieved from the Internet: <URL http://www.iklimnet.com/hotelfires/firesoftware. htm>; now available at Internet: <URL: http:/ /web.archive. org/web/20040904084050/www.iklimnet.com/hotelfires/firesoftware.html>.
European Application No. 03729004.6, EPO Patent Register, Dec. 20, 2012.
European Application No. 12158454, EPO Patent Register, Dec. 20, 2012.
In Re Bilski, (Fed. Cir. Oct. 30, 2008) (132 pages) Available at internet <URL: http://www.cafc.uscourts.gov/opinions/07-1130.pdf>.
International Preliminary Examination Report; International Application No. PCT/US03/15666; dated Aug. 6, 2004 (3 pages).
International Search Report on PCT/US2003/015666, dated May 27, 2004, 1 page.
International Search Report; International Publication No. WO 2003/100555: dated Jul. 29, 2004 (3 pages).
James Golinveaux, "A Technical Analysis: Variables That Affect The Performance of Dry Pipe Systems," 24 pages, (Sep. 2002 Tyco Fire & Building Prods.).
Jane Bauman & Brent A. Cullimore. Nonlinear Programming Applied to Calibrating Thermal and Fluid Models to Test Data. Semiconductor Thermal Measurement & Management (SEMITHERM) 18th Symposium; IEEE Press 2002. 6 pgs. [retrieved on Jan. 22, 2008] Retrieved from the Internet: <URL:http://www.crtech.com/docs/papers/2002/calibrating.pdf.
John D. Anderson, Jr., Modern Compressible Flow, Ch. 3: "One-Dimensional Flow," pp. 45-99, (2nd ed.).
John D. Anderson, Jr., Modern Compressible Flow, p. 87, (2nd. ed.) [retrieved by Third Party]; Ch. 3: "One-Dimensional Flow," pp. 45-99, (2nd ed.).
K. Linder; "The" Sprinkler Program; Journal of Fire Protection Engineering; 1993; pp. 11-16; V. 1.2, Software Review, SAGE Publications.
Ken Edwards, Example from of Newsletter vol. 5, No. 8, (Oct. 9, 2003 LMNO Engineering, Research, and Software, Ltd.) [online] [retrieved on Aug. 15, 2006] Retrieved from the Internet: <URL:http://www.lmnoenq.com/Pipes/example3(4).htm>.
Ken Edwards, Pipe Network Calculator Hardy Cross Darcy Weisbach or Hazen Williams Losses [online] [retrieved by Third Party on May 3, 2006].
Kenneth E. Isman, P.E., "Beyond NFPA 30—1996 Edition," 1 page, Sprinkler Quarterly (Fall 1997) [provided by Third Party].
KYPipe, LLC., Pipe2000: GoFlow [online] (unknown) [retrieved Aug. 15, 2006] Retrieved from the Internet <URL:http://www.kypipe.com/goflow-features-print.htm>.
Louis C. Burmeister, Convective Heat Transfer, (2nd Ed. 1993), p. 193, [retrieved by Third Party].
Louis C. Burmeister, Convective Heat Transfer, Ch. 5: "Laminar Boundary Layers," (2nd ed. 1993), pp. 160-225, A Wiley-Interscience Publication, New York.
Love, John J, Deputy Commissioner for Patent Examination Policy of the U.S. Patent and Trademark Office, Memorandum entitled "Guidance for Examining Process Claims in view of In Re Bilski", Jan. 7, 2009 (I page).
M.E.P. CAD, AutoSPRINK VR: Features [online] (unknown) [retrieved Aug. 15, 2006] Retrieved from the Internet, now available at Internet<URL: http://web.archive.org/web/20060810030235/http://www.autosprink.com/ and links thereon>.

May 15, 2007 International Search Report for International Application No. PCT/US2006/038360. (1 page).
May 15, 2007 Written Opinion of the International Searching Authority for International Application No. PCT/US2006/038360. (3 pages).
National Aeronautics and Space Administration (NASA), Mass Flow Choking (updated May 18, 2006)[online], [retrieved on Mar. 19, 2007],Retrieved from the Internet: <URL: http://www.grc.nasa.gov/WWW/K-12/airplane/mflchk.html>.
National Aeronautics and Space Administration (NASA), Mass Flow Choking [online],[retrieved by Third Party on May 3, 2006], Retrieved from the Internet:<URL http://www. g re. nasa. gov/WWW/K-12/airplane/mflchk. html>.
Non-Final Office Action issued in U.S. Appl. No. 12/089,034 (published under US 2010/0299122, now U.S. Pat. No. 8,612,189), dated Feb. 20, 2013 (10 pages).
Nor-Par a.s. PIPENET: Fluid Flow in piping networks [online] (unknown) [retrieved on Feb. 1, 2008] Retrieved from the Internet: <URL: http://www.norpar.com/pipenet.html>.
OmniCADD, Inc. Custom Software Designers, OmniCADD SOS [online] [retrieved Aug. 15, 2006] Retrieved from the Internet<URL: http://www.iklimnet.com/hotelfires/firesoftware.htm> and link thereon>; now available at Internet:<URL: http://web.archive.org/web/20040806135715/www.omnicadd.com/products.htm>.
Proto-Power Corp., Software-Proto-Sprinkler™ [online] (2006) [retrieved Aug. 15, 2006 and on Feb. 1, 2008] Retrieved from the Internet: <URL: http://www.iklimnet.com/hotelfires/firesoftware.htm> and link thereon>; now available at Internet:<URL: http://www.protopower.com/index.php?paQe=32>.
R. Wells and R. Allen; SPRINKMOD—pressure and discharge simulation model for pressurized irrigation systems., 2. Case study; Irrigation Science; Jan. 1999; pp. 149-156; vol. 18, No. 3; Springer-Verlag.
Response to Non-Final Office Action as filed in U.S. Appl. No. 12/089,034 (published under US 2010/0299122, now U.S. Pat. No. 8,612,189), dated Jun. 20, 2013 (90 pages).
Reynolds Number (rev. Apr. 19, 2007) [online] [retrieved on Apr. 20, 2007]; Retrieved from the Internet: <URL: http://en.wikipedia.org/wiki/Reynolds_number>.
Reynolds Number [online] [retrieved by Third Party on May 3, 2006]; Retrieved from the Source: http://en.wikipedia.org/wiki/Reynolds_number.
Robert A. Granger, Fluid Mechanics, Ch. 4: "Differential Forms of Fluid Behavior" pp. 153-232, Ch. 5: "Integrated Forms of Fluid Behavior," pp. 233-339; Ch. 7, "Dimensional Analysis and Similitude," pp. 359-414, (1985 & 1995), Dover Publications, New York.
Robert A. Granger, Fluid Mechanics, pp. 199, 200, 296, 379, 380, 382 & 383 (1985 & 1995) [retrieved by Third Party]; p. 381, (1985 & 1995) [retrieved by Third Party].
Robert G. Sargent; Simulation Model Verification and Validation, Proceedings of the 1991 Winter Simulation Conference, Dec. 1991, pp. 37-47.
Robert W. Fox & Alan T. McDonald, "Introduction To Fluid Mechanics," Ch. 2: "Fundamental Concepts," pp. 18-48: Ch. 4: "Basic Equations In Integral Form For A Control Volume," pp. 95-200; Ch. 6: Incompressible Inviscid Flow, pp. 241-294, (3rd ed. 1985), John Wiley & Sons.
Robert W. Fox & Alan T. McDonald, "Introduction To Fluid Mechanics," pp. 40, 126, 246 & 247, [retrieved by Third Party].
Russel P. Fleming P.E., NFPA Journal, "Predicting Water Delivery in Dry Pipe Systems" at 24, 108 (Jul./Aug. 2002).
Ryan W. Massey, Letter from representative of Third Party Consortium Re: U.S. Patent Publication No. 2005/0216242 (Jun. 28, 2006).
SIGMA Ingenieurgesellschaft mbH, SPRINK: Calculation of Pressure Drop in Sprinkler Systems, [online] (2006) [retrieved Aug. 15, 2006] Retrieved from the Internet, now available at Internet: URL<http://web.archive.org/web/20060316163957/www.rohr2.com/SPRINK_Program_description pdf>.
SINDA/FLUINT: Version (unknown) User's Manual, Sections 3.15 to 3.15.2. C & R Technologies, (unknown ), pp. 3-192 to 3-195 [provided by Third Party Jun. 28, 2006].

(56) References Cited

OTHER PUBLICATIONS

Soonil Nam & Hsiang-Cheng Kung, Technical Report: FMRC J.I. 0T0R8.RA, "Theoretical Prediction of Water Delay Time of Dry-Pipe Sprinkler Systems in the Event of Fire," 78 pages (Oct. 1993 Factory Mutual Research).

SPG Media Limited. Flowmaster—Fluid Flow Analysis Software For Power Generation Water Piping Networks [online] (2006) [retrieved on Aug. 15, 2006] Available at Internet:<URL: http://web.archive.org/web/20060907103856/www. power-technology.com/contractors/front/flowmaster/>.

Sunrise Systems Limited. Pipenet—Transient Module [on line] (1999) 3 pgs. [retrieved on Feb. 1, 2008] Retrieved from the Internet: <URL: http://www.microtechno.net/Mtbropc/Pipenet trans. pdf>.

Sunrise Systems Limited. PIPENET, Spray/Sprinkler Module, [online] (2006) [retrieved Aug. 15, 2006] Retrieved from the Internet:<URL:http://www.sunrisesvs.com/spray_sprinkler.asp>.

Sunrise Systems Limited. PI PEN ET: Leading The Way In Fluid Flow Analysis (Brochure)[online] (unknown) 6 pgs. [retrieved on Feb. 1, 2008] Retrieved from the Internet:<URL: http://www.epcmart.co.kr/spboard/board.cgi?id=epcmart_data&action=download&gul=15>.

Sunrise Systems Limited. Sunrise Systems Pipenet Vision: Detailed Demonstration and Discussion of Applications [online] (unknown) 77 pgs. [retrieved on Feb. 1, 2008) Retrieved from the Internet: <URL:http://www.norpar.com/brochures/pipenet/pipenet detailed. ppt>.

Sunrise Systems Limited. Various Examples [online] (1997-2002) 94 pgs. [retrieved on Feb. 1, 2008] Retrieved from the Internet:<URL: http://www.norpar.com/brochures/pipenet/Pipenet_Transient_examples.pdf>.

The MathWorks, Inc. Flowmaster: Fluid system modeling, simulation and control, [online] (1994-2006) [retrieved on Aug. 15, 2006] Retrieved from the Internet:<URL: http://www.mathworks.com/products/con nections/prod uct main, htm 1?prod id=283>.

Tim Frost Design Services, Inc. Calcer Hyd Prog Version 3.0, [online] (2006) [retrieved Aug. 15, 2006] Retrieved from the Internet, now available at Internet<URL: http://web.archive.org/web/20060717201554/www.tfdsi.com/calcer.htm>.

\* cited by examiner

Table 2.

| Node Nomenclature | Schema of Node |
|---|---|
| No Branching | $p^{jL}$   $\frac{f_i h_{iL}}{D_i}\frac{pv_i^2}{2}$   $\frac{f_i h_i}{D_i}\frac{pv_i^2}{2}$   $\rho g h_i \sin\alpha$   $\frac{f_i h_{iR}}{D_i}\frac{pv_i^2}{2}$   $p^{jR}$ |
| Two Branches | $P_L$ — $F_{i1}$ / i1 — $P_C$ — $F_{i2}$ / i2 — $P_R$ ; $P_U$ — $F_{i3}$ / i3 |

Figure 5

SYSTEM AND METHOD FOR EVALUATION OF FLUID FLOW IN A PIPING SYSTEM

CROSS-REFERENCE TO RELATED PATENT APPLICATIONS

This application is a continuation of U.S. application Ser. No. 13/722,959, filed Dec. 20, 2012, which is a continuation of U.S. application Ser. No. 12/573,013, filed Oct. 2, 2009, which is a continuation of U.S. application Ser. No. 10/942,817, filed Sep. 17, 2004, which is a continuation of International Application No. PCT/US2003/015666, filed May 20, 2003, which claims priority to U.S. Provisional Application No. 60/408,257, filed Sep. 6, 2002, U.S. Provisional Application No. 60/381,323, filed May 20, 2002, and U.S. Provisional Application No. 60/381,568, filed May 20, 2002, each of the listed applications above is incorporated herein by reference in their entirety.

BACKGROUND OF THE INVENTION

The modeling of real-world systems through mathematics has been utilized to determine how systems response to real-world inputs. Due to the nature of such modeling, computers are often used to assist in such modeling. The modeling of liquid and gas flow in piping network presents a situation in which the more detailed the piping network, the more difficult it is to model such piping network, and in most cases, the model does not correlate accurately with real-world piping networks. One area of modeling in piping network is the determination of the location of the liquid front as the liquid moves through the piping that was previously occupied by another liquid or gas. Where the liquid is moving through a single uniform straight pipe, it is believed that an accurate model, i.e., an analytical model, of the characteristics of the liquid can be obtained. Where a movement of the liquid is initiated at some point in a large network of branching pipes so that the liquid flows through the network thereafter, it is believed that the current analytical models are inadequate for such type of complex networks.

These complex piping networks are utilized in the fire protection industry, and, in particular for providing a sprinkler system. In certain sprinkler systems, the pipe is filed with a gas and liquid enters the piping network once the gas is expelled from the piping network by actuation of a sprinkler. These pipe networks are known as "dry pipe" sprinkler systems. Dry pipe sprinkler systems are utilized in areas that are unheated and that are subjected to freezing temperatures. In contrast to a 'standard' wet sprinkler system in which the pipes supplying sprinklers are refilled with water under constant pressure, the sprinkler piping for a dry system is, preferably, filled with air under pressure. The air pressure in the system holds a dry pipe valve closed, and the valve opens with a loss of air pressure in the system. The actuation of one or more sprinklers will allow air to escape the piping network and result in the tripping of the dry pipe valve and the filling of the piping network with water (to the sprinklers). By nature, a dry sprinkler system is slower to respond to fire conditions than a wet system because the air must first be exhausted from the system.

It would be advantageous to those individuals who utilize dry pipe sprinkler systems to accurately model the performance of dry pipe sprinkler systems. Currently, these individuals are required to demonstrate certain physical characteristics of the dry pipe system as a function of time by a physical test of an actual system, where the actual system has a volume capacity greater than 750 gallons and in certain cases where the system volume is greater than 500 gallons as set forth in National Fire Protection Association ("NFPA") in NFPA 13 "The Standard for the Installation of Sprinkler Systems," 2002 Edition, which is hereby in its entirety incorporated by reference. Rather than testing, individuals would benefit from a model of a dry pipe sprinkler system that could provide characteristics such as, for example, the evacuation of the air from a dry system upon actuation or the tripping of a dry pipe valve, the location of the flow front of the liquid through the system, and the respective time required to do so.

It is believed, however, that these individuals do not have a technique of modeling a dry pipe sprinkler system in manner to accurately predict the characteristics of such dry pipe systems in lieu of an actual test. As a result, it is believed, that these individuals often restrict the system size on the basis of the volume of air that is trapped in the system to avoid any type of actual testing. For example, NFPA 13 provides for certain dry pipe sprinkler systems to be installed without testing. On the other hand, assuming NFPA 13 is the governing standard for the sprinkler system, if such individuals elect to install a system and it fails the required actual testing, the individuals would have to modify or re-design and re-install the system to conform within the requirements of NFPA 13.

As a result of the possibility of failing the required performance test, individuals tend to develop systems smaller than the maximum system that could be utilized. These smaller systems would be selected so that they fall within the category of NFPA 13 of system that can be installed without performance testing. The result is that many systems in unheated warehouses, for example, that could cover a maximum of 40,000 square feet are restricted to 25,000 to 30,000 square feet on the basis of the volume limitation. This results in multiple systems being installed when fewer systems could conceivably be used. In addition, the NFPA restrictions do not recognize variations in supply pressure—a higher supply pressure will permit a higher liquid flow rate and velocity and hence assist in exhausting (or pushing) the air out of a system more quickly than would a lower pressure. Consequently, it is believed that all systems are penalized for the avoidance of the actual testing requirement, and out of the fear of failing the test after the systems are installed.

In addition, the performance of a test introduces water into the piping system. Following the test, the water is drained from the system prior to re-introducing air pressure. Often, water is trapped within the pipes and causes freezing problems after the system is put into service. Another effect of introducing water into the piping network, draining it, and filling the system with air is that any residual moisture can settle and cause premature corrosion within the steel pipe. Hence, it is desirable to avoid actual testings.

Individuals have developed a model to predict time-based characteristics of the dry pipe systems. It is believed that this known model required individuals to convert a dry pipe system under evaluation into a fixed framework or topology dictated by the model. That is, regardless of the actual design, in order to model the design, the actual design must be "translated" into the fixed topology in order for modeling to be performed. This fixed topology model, however, fails to take into account the behavior and characteristics of liquid, gas with liquid and gas flow at every point through every pipe in a dry pipe design.

In particular, as set forth in Factory Mutual Research Corporation ("FMRC") Document Index No. OT0R8.RA, October, 1993, FMRC provides for the known fixed topology model that fixes a test sprinkler head on the same branch regardless of where in the actual design the test sprinkler would be the one hydraulically farthest from the dry pipe valve would be located; and the riser is fixed to the middle of a cross main piping regardless of where such riser is to be placed in an actual design. The known model is believed to be unreliable because of the forced translation from the arbitrary design into the fixed topology of known model. In addition to requiring a forced translation, the known model summarizes (i.e., "lumps") all branch lines before and after a main feed line (i.e., "Feed Main") as respective volumes instead of accounting for liquid flow, gas flow and liquid-gas flow behavior in each pipe.

The known model, in utilizing a forced translation and lumped volumes, provided predictive values for liquid flow that are believed to be higher than a suitable threshold for individuals (e.g., engineer, architects, planners, contractors and jurisdictional authorities) to rely upon. As such, the known model may provide a generalized technique to analyze dry pipe systems but does not account for flow through each pipe so that individuals can use the predictive results with a suitable degree of accuracy.

SUMMARY OF THE INVENTION

The present invention provides for a method to model a complex system of pipes accurately. This model takes into account the physical processes in every part of a tree-type piping system and provides for an accurate modeling of a real world tree-type piping system. The preferred embodiments of this model have been verified by comparisons against known piping systems. Thus, the present invention provides a schema to determine liquid flow, gas flow and their interactions in piping systems that was heretofore believed to be unavailable.

The preferred embodiments of the present invention have reliably predicted a transit time of liquid flow through referential tree-type piping systems by evaluating the flow of liquid, gas or mixture thereof through each pipe of the tree-type piping system. The preferred embodiments employ at least one computational engine that is capable of predicting time based response characteristics of known referential tree-type piping systems within a variance believed not to be achieved by other models. In particular, the preferred embodiments achieves a variance or error of 12%, 7%, 3%, 4%, 1% and even 0% depending on the referential system employed.

In the preferred embodiments, the behavior and characteristics of the liquid and gas flow at every point in the piping system are accounted for in the piping system. By accounting for the behavior and characteristics of the liquid, gas or mixture thereof, the preferred embodiments are capable of predicting behavior and characteristics of various liquids and fluids such as, for example, propyl alcohol, ethylene glycol, or water at every point of the piping system. In particular, the preferred embodiments estimate a time duration for gas pressure in the piping network to drop below a threshold pressure when the gas is permitted to escape from the network through an open node by: (a) determining whether a ratio of atmospheric pressure to internal pressure in the network is less than a first ratio or at least equal to a second ratio; (b) calculating that the mass flow rate of the gas as being a function of a discharge area, pressure and temperature of the discharge area from the system is less than the first ratio and the mass flow rate of the gas as being a function of a discharge area, pressure, temperature of the discharge area and a ratio of ambient pressure to pressure at the discharge area when the ratio is at least equal to the second ratio; (c) relating the mass flow rate to a change in pressure of the gas, its velocity and temperature at the discharge area; and (d) solving for a change in gas pressure in the system over time as a function of mass flow rate, temperature, velocity, and pressure at the discharge area.

The preferred embodiments also approximate a duration of time for any liquid front traveling from an initial location in the piping network to a discharge opening in the network (i.e., a transit time) by: (a) accounting for a velocity of the liquid as the liquid moves from the initial position to at least one of a segment of the network without a branch, a segment to a node with two branches, and a segment to a node with three branches in the network; (b) accounting for a representative velocity of bubbles as liquid and gas travels through the network; (c) determining the losses as the liquid moves through at least one of a segment of the network without a branch, a segment to a node with two branches, and a segment to a node with three branches in the network; and (d) determining whether gas flow in the system is one of an adiabatic or isothermal process. Furthermore, the preferred embodiments determine an approximation of a change in pressure of the liquid compared to time as the liquid front travels from the initial location to the discharge opening based on the estimation of the trip time and the approximation of the transit time.

The present invention also provides for, in a preferred embodiment, a computer program for analyzing models of dry pipe systems. The computer program includes a user interface and a computational engine. The user interface allows a model of a dry pipe system to be defined and the computational engine determines a liquid flow time through the model of the dry pipe system. The computational engine that employs the methods of the preferred embodiments, and provides a verification of the liquid flow time in a model of a referential dry pipe system within 20% of an actual liquid flow time in the referential dry pipe system.

The present invention further provides for, in another preferred embodiment, a method for use in a development of a tree-type piping system. The method can be achieved by generating at least a time-based characteristic of liquid flow through the tree-type piping system. The at least a time based characteristic has a value based on a calculation process that evaluates the physical processes of liquid and gas flow in each pipe of the tree-type piping system.

The present invention additionally provides for, in yet another preferred embodiment, a process of installing a dry pipe sprinkler system. The process can be achieved by: determining a liquid delivery time of a liquid at a sprinkler head or a nozzle when the sprinkler or nozzle is actuated in a model of a dry pipe sprinkler system; and constructing a dry pipe fire sprinkler system based on the model of the dry pipe sprinkler without physical verification of the predicted transit time. The liquid delivery time is determined to be less than a desired value. The process provides for the ability to prototype, plan and evaluate a new dry pipe system. The process also provides for the ability to retrofit an existing dry pipe system to meet desired criteria to ensure an adequate response for the existing system.

BRIEF DESCRIPTION OF THE DRAWINGS

The accompanying drawings, which are incorporated herein and constitute part of this specification, illustrate a preferred embodiment of the invention, and, together with the general description given above and the detailed description given below, serve to explain the features of the invention.

FIG. 5 illustrates a table of node numbering.

DETAILED DESCRIPTION

Figure 1:
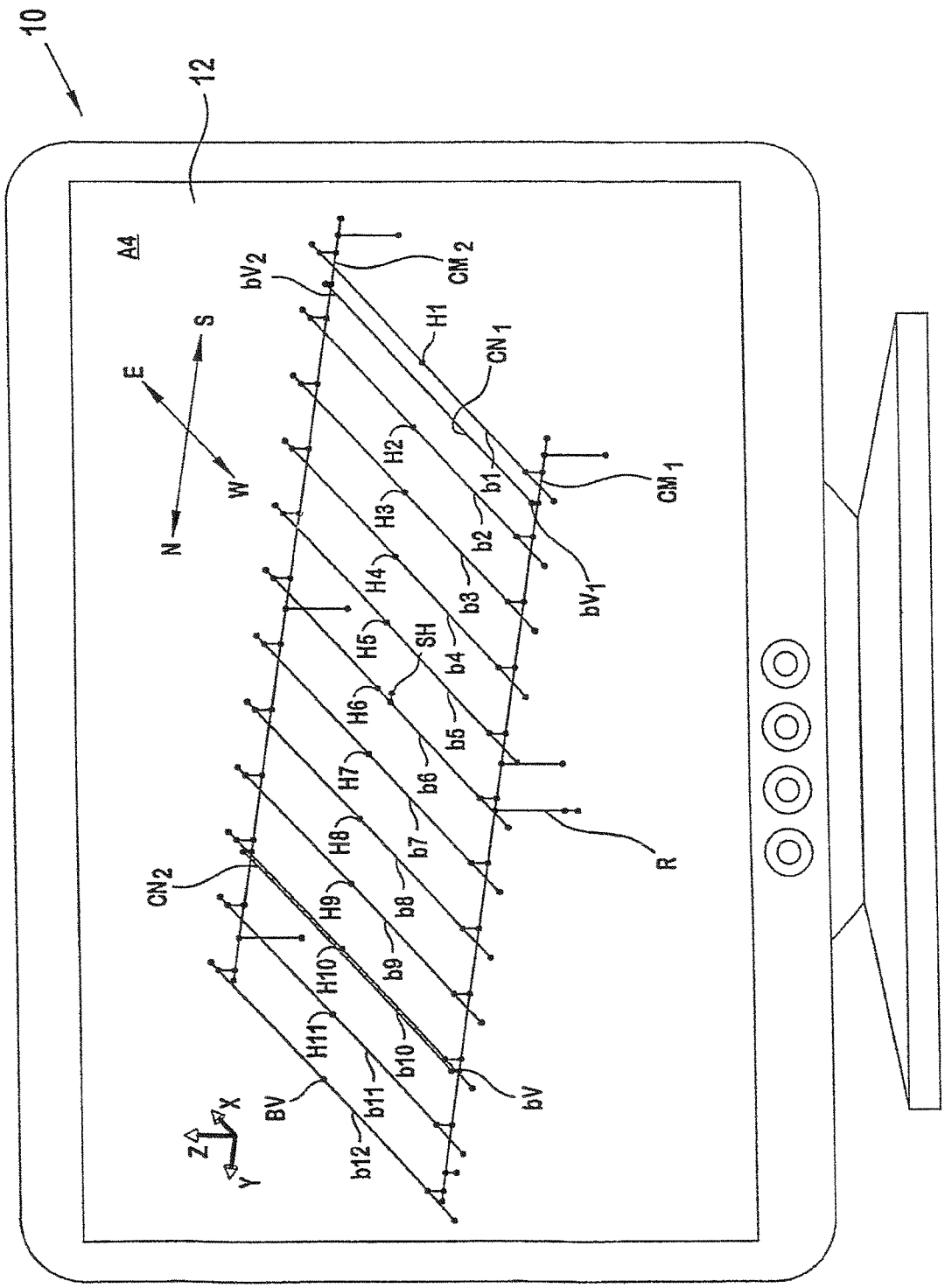
FIG. 1 depicts a graphical user interface displaying a 3-D wire frame model of a first referential dry pipe fire protection system of a preferred embodiment of a dry pipe computer modeling program embodied in the graphical user interface.
Figure 2:
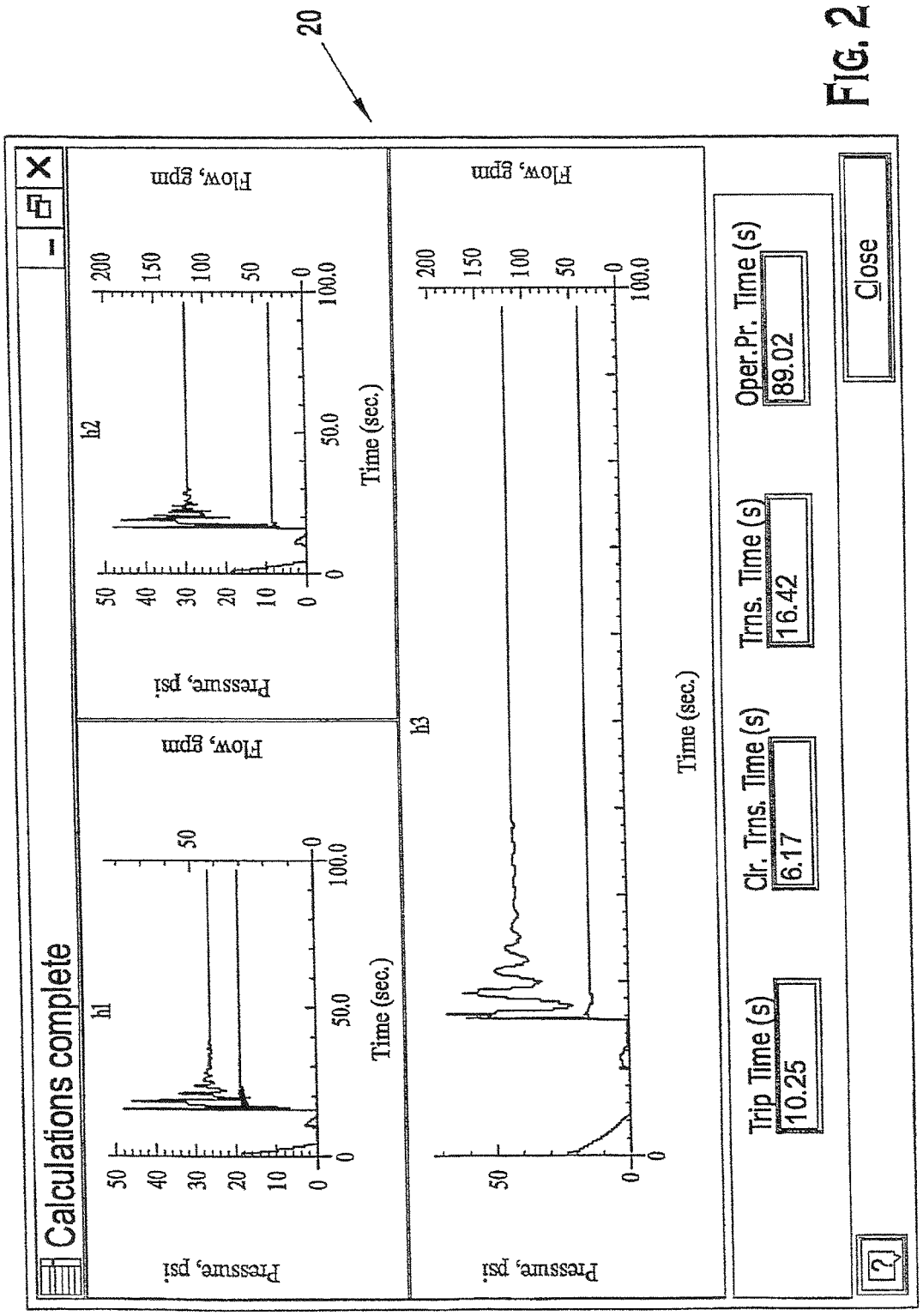
FIG. 2 depicts results of the analysis of the model in graphical form by the graphical interface utilizing a preferred embodiment of the dry pipe computer-modeling program.

FIG. 1 depicts a graphical user interface that permits a system of tree-type fluid transporting network to be modeled in order to predict certain characteristics of the system, such as, for example, a valve actuation or trip time (i.e., the time it takes for a gas pressure in the system to drop below a threshold that allows a fluid to flow into the system), transient time (i.e., the time it takes for a fluid to reach one or more opening of the system) and steady state time (i.e., the time is takes for the fluid flowing through the network to the opening to reach a steady state flow condition). As used herein, the term "tree-type" denotes a branching configuration of pipes. FIG. 2 shows graphical outputs of a preferred embodiment of a computer modeling program. The computer modeling program permits at least these characteristics to be determined with a reasonable degree of certainty based on verifiable and repeatable correlations between predicted characteristics and actual characteristics of known tree-type fluid transport system.

The model of the piping system is composed of piping segments and piping connections. The piping segments are characterized by lines and the piping connections are characterized by nodes. Nodes can represent either a point of transition from one pipe size to another, elbows or bends, tees and laterals for dividing or mixing streams and valves, and exit opening. The fluid supply can be modeled as either a static fluid supply or variable fluid supply (i.e., pump driven fluid supply). Currently, the model accepts one fluid supply source and can accept fluid from more than one source.

It is noted that in the preferred embodiments, the fluid is a fire fighting fluid such as water or Inergen® and the gas is nitrogen or ambient air. The program, however, can evaluate other fluids including any single-phase flow of liquid base on the fluid's corresponding density, specific gravity, or specific weight. That is, the program is capable of predicting the delivery of any single-phase fluid in a piping network where the fluid delivery is controlled from a location that is remote from the point of delivery. For example, if the piping network is unsupervised, and contains air at atmospheric pressure, this can be entered into the model using the specific gravity of air and a pressure of 14.7 psi, or one bar. Similarly, if a liquid is being delivered in that network, the flow of the liquid can be predicted in the program by entering the physical properties (specific gravity, or density, or specific weight) of the fluid being delivered.

In one preferred embodiment, the computer program can model a piping system to predict the trip time, delivery time and steady state time of a flow of propyl alcohol in the system from a trip valve proximate a supply to an opening at the farthest location from the trip valve. For example, the system in this model can be configured with a main line with 20 branch lines in a tree-type array and may be provided with a system volume of about 1111 gallons and initially filled with pressurized Nitrogen gas at 100 degrees Fahrenheit.

In another preferred embodiment, the computer program can predict the trip time, delivery time and steady state time of a flow of ethylene glycol in the system from a trip valve proximate a supply to an opening at the farthest location from the trip valve. For example, the system in this model can be configured with a main line with 20 branch lines in a tree-type array and may be provided with a system volume of about 1111 gallons and initially filled with pressurized Nitrogen gas at 100 degrees Fahrenheit.

In yet another preferred embodiment, the computer program can predict the trip time, delivery time and steady state time of a flow of water. For example, at least eight actual referential dry pipe systems provided with an array of twelve branch lines, and two cross mains were modeled and the liquid delivery time for each was predicted by the computer program.

Thus, the computer program is not limited to fire protection and can be used to calculate a fluid transit time for other applications involving fluid delivery through a piping network such as, for example, a piping network in a hospital from a centralized source to a given patient room or point of application; a piping network for oil, other petroleum or non-petroleum chemical liquid product (e.g., isopropyl alcohol, ethylene glycol) or water through a distribution network in a pipeline or city grid of water mains, or a piping network to deliver paint or other fluids to a remote location or to robotic painting machine in an industry such as automobile manufacturing.

When the computer program is used in a fire protection environment, the piping system can be modeled as a tree-type system (i.e., a single cross-main supplies fluid to branch pipes that are fitted with automatic sprinklers). Each pipe or node in the model is categorized as members of either a Feed Main, Cross Main, Riser Nipple, Branch Line and drop/sprig portion of the dry pipe system.

To build a model using the computer program, the user can create a dry pipe tree system by specifying a total number of sprinkler based on the number of branch pipes multiplied with the number of sprinklers, the total coverage area based on the distance between branch pipes multiplied with the distance between sprinklers. The user provides information as to the number of sprinkler heads from the left side of the system the main will be located; location and length of the feed main; elevations of the sprinklers and pipes; and a fluid supply. Using these data, the computer program, in connection with a computer, generates a line-node-model of the dry pipe system on a graphical display screen. The line-node model can be displayed as a plan view, front view, side view, top view, or perspective view rotatable about a predefined origin. The line-node model provides information as to the number of pipes and "nodes" in the system. By viewing the line-node model plan, the user can modify the system as required for any desired configuration of the dry pipe system.

The computer program is configured to allow the user to enter physical attributes of the respective sprinklers and pipes. For example, the user can enter the K-factor, orifice diameter, minimum operating pressure and other data suitable to provide a representation of a sprinkler at a specified location in the system. Similarly, the user can specify whether the pipe is a branch line, cross-main, drop, or feed-main; the starting and ending nodes that the pipe is connected to, pipe schedule, size, internal diameter, Hazen Williams C-Factor, absolute roughness, length, fittings, equivalent length, total length and other suitable attributes in modeling the dry pipe system. Each of the nodes generally require data input on its suitable physical attributes such as, for example, whether the node is a supply, heads, non-flowing node, X-Y orientation, elevation, closed or open configuration, K-factor, orifice diameter, operating time and other attributes suitable for the computer program to function for its intended purpose in modeling a hydraulic system, which preferably is a dry pipe system.

Once the data representing the physical attributes for the dry pipe system are entered, the computer program builds a model of the dry pipe system that is represented by mathematical equations. The model of the dry pipe system allows for the computer program to simulate various time based response characteristics of the dry pipe system such as, for example, trip time, transit time and operating pressure time, during an actuation of any sprinkler head in the piping network using one or more computational engine. Further, by a reconfiguration of the preferred embodiments of the program, the reconfigured program can be used to model dry pipe systems with loops in the pipes, pumps (e.g., fire pump), one-way valve (e.g., backflow preventer), valve opening accelerator, and sequential fluid deliveries (e.g., consecutive sprinklers actuation) in the system.

In FIG. 2, a display window located at the far left upper corner of the display with heading h1 illustrates pressure and flow as a function of time, respectively for the characteristic of the trip time for the modeled system. A display window on the right corner with heading h2 illustrates the pressure and flow of the modeled system as a function of time, respectively, for the characteristic of transit time. A large window with heading h3 illustrates the pressure and flow rate of the modeled system as a function of time, respectively, for the characteristic of operating pressure time. These characteristics can be generated by the computer program in conjunction with one or more computational engines (designated herein as PIPEFLOW or FLOWCALC) that have been developed as part of the preferred embodiments and described as follows.

Figure 3A:
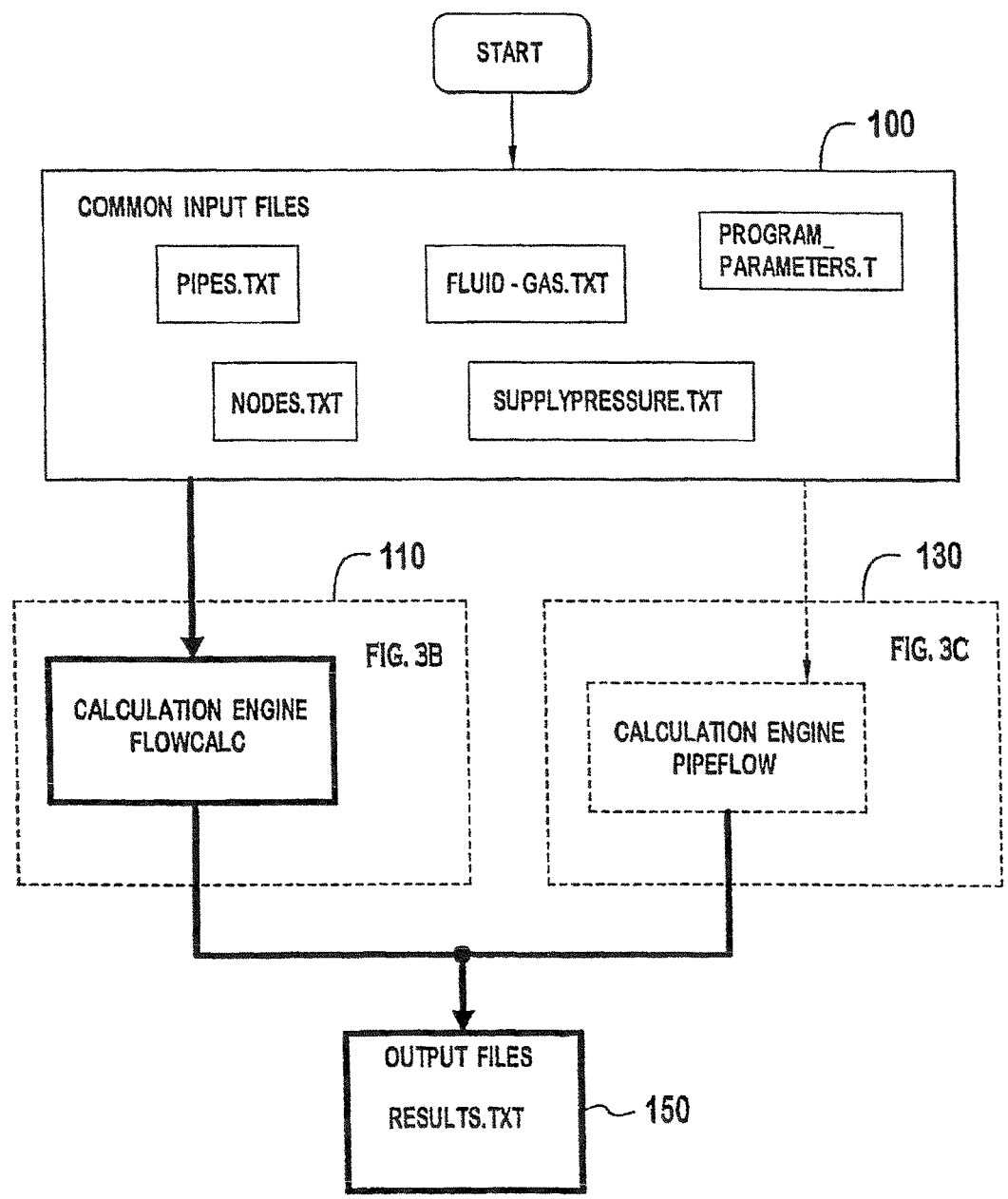
FIG. 3A illustrates a flow chart of a preferred embodiment of the computer-modeling program.

Referring to FIG. 3A, an overview of the processes for the computer program is shown. In particular, with reference to process box 10, files regarding physical attributes of the system, such as attributes of the pipes, number of nodes, supply, fluid, gases and program parameters, as discussed earlier for a model of a dry pipe system, are prepared in a suitable format for processing. Other processing such as, for example, conversion from English units to SI units is also performed here. Once the data are formatted, the data can be used by computational engines to determine at least one desired physical response of the model such as, for example, a dry pipe valve trip time and fluid transit time.

As follows, the text will describe the computational engines that can be used with the computer program, the different theoretical approaches in support of the computational engines and verification of the correlation between the computer model and actual standardized dry pipe systems via experimental results. As noted earlier, two computational engines can be used to solve the transient flow problem for a piping system: FLOWCALC and PIPEFLOW. These computational engines were developed from two different theoretical approaches for expressing non-steady fluid flow properties in pipes. FLOWCALC is based on energy equations for liquid and temperature relaxation equations for a moving gas whereas PIPEFLOW is based on momentum balance equations for a gas, liquid or gas-liquid mix control volume in each of the pipes of the system. FLOWCALC may be thought of as a modeling approach which solves the equations of motion in the vicinity of the flow front (i.e., the furthest downstream areas of fluid flow) whereas PIPEFLOW may be thought of as a modeling approach which solves the equations for motion for each pipe in the system during the entire transient flow period. That is, FLOWCALC creates and solves the system of equations describing pipes with liquid considering gas, either entrapped or being depleted through open sprinkler(s), to impose pressure upon the liquid front(s). It alters the system of equations depending on what system components are filled with liquid adding gas pressure components to liquid fronts, if any, in the pipe at consideration. PIPEFLOW, on the other hand, creates and solves the system of equations describing the entire piping system for the entire calculation process/period. It alters system component parameters depending on actual media flowing in the component—either liquid or gas. Regardless of the underlying approaches to solving the fluid and gas flow problem in piping network, the preferred embodiments of the computational engine can provide a correlation of less than 20% between a computer model and its corresponding physical piping network. Each computational engine can be used alone or in combination with the other computational engine. In the latter case, the two computational engines can provide a degree of redundancy and error cross-checking. FLOWCALC is presently the preferred method of solving the transient fluid flow problem because it can solve the problem more efficiently (essentially because there are fewer equations to solve), although both PIPEFLOW and FLOWCALC are found to provide comparable predictions to actual test results.

A description of the theory and program flow for each of the FLOWCALC and PIPEFLOW computational engines is provided as follows. It should be noted that for both of the computational engines, the following underlying assumptions in modeling and analyzing an arbitrary dry pipe system are made: (1) the fluid is incompressible; (2) pipes do not suffer deformation; (3) fluid front is perpendicular to pipe centerline; (4) all open sprinklers are opened simultaneously; (5) the dry pipe opens instantly; (6) system supply node coincides with the dry pipe valve; and (7) supply curve (i.e., pressure as a function of flow rate) is modeled at 1.85 power.

The mathematical framework used to solve for the dry pipe valve trip time, transit and steady state flow times as embodied in the FLOWCALC computational engine for a user-defined piping system will now be described. The FLOWCALC equations for flow properties of the gas and liquid are based on the unsteady Bernoulli Equation for fluid flow, and temperature relaxation equations for gas flow. These equations are used to solve for flow properties in the regions of fluid flow and gas flow in the system at any point in time, with the appropriate boundary and continuity conditions coupling the equations for fluid and gas. Additionally, both FLOWCALC and PIPEFLOW calculation engines simulate reverse flows. The FLOWCALC computational engine simulates bubble flow in a branch line containing drops and open sprinkler. Similarly, the PIPEFLOW computational engine can also perform bubble simulation to account for such effect in the piping system.

As noted above, fluid flow through pipes are modeled using the Bernoulli Equation for unsteady flow. The general form of the equation expresses the states of the fluid at the first and the second endpoints, which in this case are as follows: the flow front and the nearest upstream node. As the fluid flow branches, Bernoulli's equation is created for each pipe, containing moving fluid front, and for an open sprinkler, if any, as the current pipe downstream node.

Four examples are provided: (1) flow from the water source branching into a cross main and a branch line; (2) flow in a pipe with closed terminal node; (3) flow which splits into three branches; and (4) flow in a pipe with an open sprinkler. The continuity equations for fluid flow rely on mass conservation equations and equations for mass flow through open sprinkler. The equations for gas flow are coupled to the equations for liquid flow by imposing two boundary conditions: the liquid velocities at the liquid/gas interface are the same, and equations that express the pressure of the liquid in terms of the gas pressure for either adiabatic or isothermal gas flow process. The equations governing friction and minor (or local)-losses in the pipes, and the minor loss parameters for some typical fittings are provided. Accordingly, in the next section, an overview of the program flow is discussed along with a presentation of the equations that can be used with the respective portion of the flow chart and a summary of how the computational engine uses the equations to determine at least the trip time, transit time and pressure of fluid in a model of a dry pipe network.

Figure 3B:
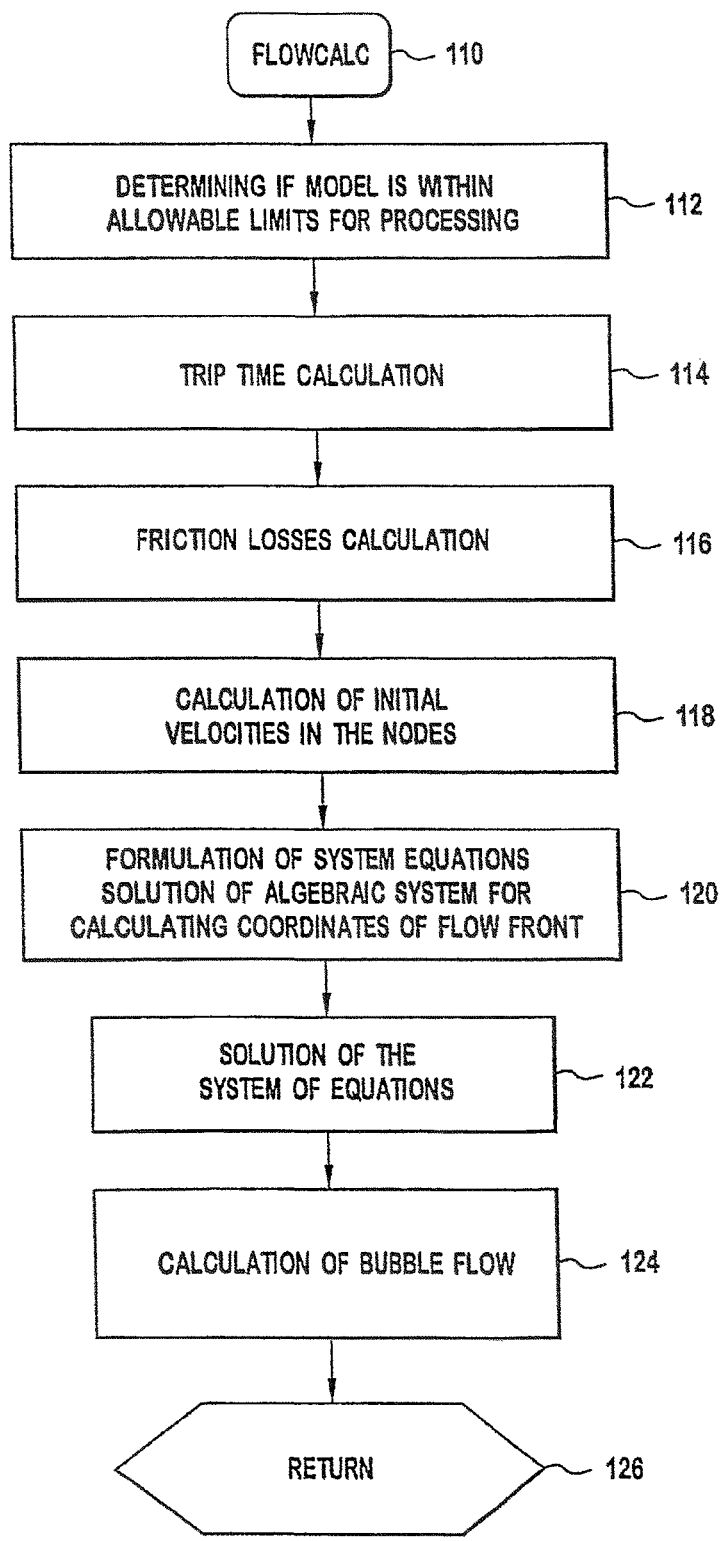
FIG. 3B illustrates in further detail a subsection of the flow chart of FIG. 3A.

Referring to FIG. 3B, the FLOWCALC computational engine performs a check of the input data at process 112 to determine whether the model of the dry pipe design is within allowable limits for processing. For example, the process 112 can check to determine if values of the fluid density or viscosity are outside operational limits. If the model can be processed, the FLOWCALC computational engine moves on to the next level of processing at 114 where a trip time is calculated after the instant a dry pipe valve has opened can be performed.

In order to determine whether the flow of gas through the pipes are to be modeled on the assumption of an adiabatic case, i.e., perfectly insulated surfaces or an isothermal, i.e., constant temperature surfaces, the computational engine performs an analysis of the Reynolds number of the gas in the dry pipes to determine a relaxation time for the temperature of the gas and the temperature of the pipe to reach a temperature equilibrium. A length L at which the gas must travel, assuming steady flow, in order to reach the temperature equilibrium (i.e., a "relaxation length") with the pipe is calculated as follows:

$$L = R\frac{Re}{2NuPr} \qquad \text{Eq. (FC1)}$$

where L is the relaxation length;
R is the radius of the pipe;
Pr is the Prandt number
Nu is the Nusset number, which has one of the following values:
Nu=3.66 if Re<2300 and Nu=0.023 $Re^{0.8}$ $Pr^{0.4}$ if Re>2300.

The Reynolds number Re can be calculated with the following formula:

$$Re = \frac{DV}{v} \qquad \text{Eq. (FC1.5)}$$

where DV is the product of the velocity of the fluid and the D is the internal pipe diameter and
v is the kinematic viscosity of the fluid.

The relaxation length L allows the computational engine to determine the relaxation time τ, i.e., the time at which the temperature of the gas flowing in the pipe reaches equilibrium with the average pipe temperature using the following formula:

$$\tau = L/V \qquad \text{Eq. (FC2)}$$

To determine whether the underlying assumption for the modeling of the flow of the gas is an adiabatic case or isothermal case, the FLOWCALC computational engine decides one or the other based on a threshold value of the relaxation time depending on the actual pipe length and current velocity of gas flow. In the case where the flow is rather slow at a particular segment of a pipe then, at some point of time, gas temperature will equalize with the pipe wall temperature thereby indicating that is an adiabatic case. In the case of high velocity gas flow at a particular segment of a pipe then the temperature changes of gas are non-essential as gas quickly flows through the pipe and for numeric purposes the gas temperature changes can be neglected thereby indicating that the process is an isothermal one. The computational engine then computes the outflow of gas and velocity of the fluid flowing into the pipe.

Depending on the ratio of internal to ambient pressure, the computational engine relies on the following formulas to determine the mass flow rate of the gas at the moment a sprinkler opens:

$$\dot{m}_a = A_a P_a \left[ \frac{\gamma}{RT_a} \left( \frac{2}{\gamma+1} \right)^{\frac{\gamma+1}{\gamma-1}} \right]^{1/2} \qquad \text{Eq. (FC3)}$$

for $P_\infty/P_a < (\gamma+1/2)^{\gamma/\gamma-1}$ or $$\dot{m}_a = A_a P_a \left\{ \frac{2\gamma}{RT_a(\gamma-1)} \left[ \left(\frac{P_\infty}{P_a}\right)^{\frac{2}{\gamma}} - \left(\frac{P_\infty}{P_a}\right)^{\frac{\gamma+1}{\gamma}} \right] \right\}^{1/2} \qquad \text{Eq. (FC4)}$$

for $P_\infty/P_a \geq (\gamma+1/2)^{\gamma/\gamma-1}$ where $\dot{m}_a$ is the mass flow rate,
$P_a$ and $P_\infty$, are the gas pressure before the nozzle and the atmospheric pressure respectively,
$T_a$, is the gas temperature,
$A_a$ is the discharge area,
γ the ratio of specific heat at constant pressure versus the specific heat at constant pressure at constant volume, γ=1.4 for 2-atomic gases and
R is the gas constant.

To relate the change in pressure, volume and temperature to the mass flow rate of the gas, the following equation is used:

$$\frac{d}{dt}\left[\frac{P_a V_a}{RT_a}\right] = -\dot{m}_a \qquad \text{Eq. (FC5)}$$

where $V_a$ is the total volume of gas in the system.

To relate the change in mass flow rate $\dot{m}_a$ to pressure, velocity, density, and cross-sectional area, the following equation is used:

$$\dot{m}_a = \rho v S = \frac{P_a}{RT_a} v S, \qquad \text{Eq. (FC6)}$$

where S is the cross sectional area of the pipe.

The velocity of the gas in the piping can be determined by the following relation between mass flow rate $\dot{m}_a$ and the following formula (by simplification):

$$v = \sqrt{\gamma RT_a}\frac{S_a}{S}\sqrt{(2/(\gamma+1))^{(\gamma+1)/(\gamma-1)}} =$$
$$v_s \frac{S_a}{S}\sqrt{(2/(\gamma+1))^{(\gamma+1)/(\gamma-1)}} = 0.579 v_s \frac{S_a}{S}, \qquad \text{Eq. (FC7)}$$

where v is the velocity of gas flow in piping;
$v_s$ is the speed of sound through the gas;
$S_a$ is the area of opening to the outside ambient;
S is cross section area of gas flow inside the pipe.

The highest gas flow velocities are in least size pipes, i.e. in sprigs or drops. The ratio between sprig/drop diameter and the open head nozzle diameter is higher than 2. In this case the maximum gas velocity is 7 times less than the speed of sound through the medium. Therefore, the difference in parameters of density, pressure, and temperature between the stagnation gas and the moving gas, which is proportional to squared Mach number, is not more than 2%. Hence, equations (FC3), (FC4) are appropriate for the calculations of gas pressure in typical dry pipe sprinkler systems with the accuracy of not worse than 2%.

Before dry pipe valve trips, the internal gas pressure changes are described as follows:

$$\frac{dP_a}{dt} = \frac{\dot{m}_a RT_a^0}{V_a}\gamma_1(P_a/P_a^0)^{\frac{\gamma_1-1}{\gamma_1}} \qquad \text{Eq. (FC8)}$$

where $P_a^o$ and $T_a^o$=gas pressure and temperature respectively at the moment of sprinkler opening;
$\gamma_1=\gamma$ for adiabatic gas movement in the piping system,
$\gamma_1=1$ for isothermal gas movement.
In Eqs. 3 and 4:

$$T_a = T_a^o(P_a/P_a^o)^{\frac{\gamma_1-1}{\gamma_1}}, \qquad \text{Eq. (FC9)}$$

where $P_a^o$ and $T_a^o$—pressure and temperature of a gas at the time of sprinkler opens.

After dry pipe valve trips, the gas pressure in the part of the piping filled with gas is described by the following equation:

$$\frac{dP_a}{dt} = \frac{\dot{m}_a RT_a^o}{V_a}\gamma_1(P_a/P_a^o)^{\frac{\gamma_1-1}{\gamma_1}} - \gamma_1\frac{P_a}{V_a}\frac{\partial V_a}{\partial t}, \qquad \text{Eq. (FC10)}$$

The first right hand component describes gas pressure loss due to depletion through open nozzles. The second right hand component contains the derivative of internal piping system volume over time, which is caused by the movement of front of the liquid. Equation (FC10) is solved in combination with Equations (FC3), (FC4), and (FC9).

As gas and fluid move through the dry pipe system, frictional, hydraulic and minor losses must be accounted for in the nodes, main, and pipes at every point in time, and thus, in a preferred embodiment, the losses calculations described herein are constantly updated as gas, gas with fluid and fluid moves through the model of the dry pipe system. The computational engine can apply the following formulas in accounting for these losses in process 116 between, for example, an arbitrary section 1 and section 2 of a pipe segment as described below.

$$\frac{L_{12}}{g}\frac{\partial V}{\partial t} + H_2 = H_1 - \Delta H_{12} \qquad \text{Eq. (FC11)}$$

where V is the fluid velocity,
$H_1$ and $H_2$ are the specific head loss at cross sections 1 and 2,
$L_{12}$ is the length of the segment between points 1 and 2,
$\Delta H_{12}$—losses between points 1 and 2 on the pipe.

The loss term in Eq. (FC11) can be written as a superposition of the fitting or minor loss, "fit" and loss over the pipe's length "fr" to provide the following equations $$\Delta H_{12} = \Delta H_{12}^{fr} + \Delta H_{12}^{fit} \qquad \text{Eq. (FC12)}$$

$$\Delta H_{12}^{fr} = f\frac{L_{12}}{D}\frac{V^2}{2g}, \qquad \text{Eq. (FC13)}$$

where D is the pipe diameter, and
f—Darcy-Weisbach friction factor.

$$f = \frac{64}{Re},$$

for laminar liquid flow where Re is the Reynolds number from Eq. (FC1.5) above

The friction factor for turbulent flow can be determined by using any one of the following three empirical formulas:
Chen formula:

$$f = \left(-2.0\log\left\{\frac{\varepsilon}{3.7065D} - \frac{5.0452}{Re}\log\left[\frac{1}{2.8257}\left(\frac{\varepsilon}{d}\right)^{1.1098} + \frac{5.8506}{Re^{0.8981}}\right]\right\}\right)^{-2}; \qquad \text{Eq. (FC14)}$$

Churchill formula:

$$f = 8\left[\left(\frac{8}{Re}\right)^{12} + \frac{1}{(B+C)^{1.5}}\right]^{1/12},$$ Eq. (FC15a)

$$B = \left(2.457\ln\frac{1}{(7/Re)^{0.9} + (0.27\varepsilon/D)}\right)^{16},$$ Eq. (FC15b)

$$C = \left(\frac{37530}{Re}\right)^{16};$$ Eq. (FC15c)

Haaland equation:

$$f = \left[-0.782\ln\left\{\frac{6.9}{Re} + \left(\frac{\varepsilon}{3.7D}\right)^{1.11}\right\}\right]^{-2}$$ Eq. (FC16)

Minor losses such as fitting losses at valves are computed using loss coefficient's K for the standard valve types. Fitting losses at valves are computed by the computational engine using loss coefficient's K for the standard valve types as given in the following Table 1 in combination with the following formula for valves.

$$\Delta p = K\frac{\rho V^2}{2}.$$ Eq. (FC17)

TABLE 1

LOSS COEFFICIENT K FOR VARIOUS FITTINGS

| Fitting | K |
|---|---|
| Well rounded inlet | 0.05 |
| 90° elbow, threaded | |
| Regular | 1.4 |
| Long radius | 0.75 |
| 90° elbow, flanged | |
| Regular | 0.31 |
| Long radius | 0.22 |
| 45° elbow, threaded, regular | 0.35 |
| 45° elbow, flanged, regular | 0.17 |
| Return bend, threaded, regular | 1.5 |
| Return bend, flanged | |
| Regular | 0.3 |
| Long radius | 0.2 |
| T-joint, threaded | |
| Through flow | 0.9 |
| Branch flow | 1.9 |
| T-joint, flanged | |
| Through flow | 0.14 |
| Branch flow | 0.69 |
| Sudden expansion | |
| $d_1/d_2 = 0.5$ | 0.75 |
| $d_1/d_2 = 0.7$ | 0.51 |
| $d_1/d_2 = 0.9$ | 0.19 |
| Sudden contraction | |
| $d_2/d_1 = 0.5$ | 0.3 |
| $d_2/d_1 = 0.7$ | 0.2 |
| $d_2/d_1 = 0.9$ | 0.1 |

Preferably, for fire protection applications, the following formula is used:

$$\Delta p = f\frac{\Delta l}{D}\frac{\rho V^2}{2},$$ Eq. (FC18)

where $\Delta l$ is the Equivalent Pipe Length of fitting or valve and is taken from manufacturer's listings where the figure is placed after physical testing.

Fitting losses in equation (FC12) can be calculated as $$\Delta H_{12}^{fit} = \sum_{i=1}^{N} f_i \frac{\Delta l_i}{D_i} \frac{V^2}{2g},$$ Eq. (FC19)

where N is the number of fittings between points 1 and 2 of the pipe.

To determine the initial velocity of the liquid at a node, the computational engine considers the type of flow from a supply through a pipe having generally linear segments AB, BC towards a position x on the segment BC towards a node with two branches Ci, CD with branch CD flowing towards a three-branch node with branch $D_m$, $D_F$, and $D_n$. That is, the computational engine considers the following conditions of fluid moving through a pipe with a gas in the pipe: (1) no branching flow; (2) flow towards two branches; and (3) flow towards three branches. Furthermore, for either of these three types of equations, there are two modifications to each of the three—gas ahead of liquid front is entrapped in closed volume or is depleted through the opening somewhere downstream of the flow.

For the first case, the computational engine relies on modeling fluid flow between a pipe segment AB to a pipe segment BC based on a variation of the known Bernoulli equation as follows.

$$\frac{L_B}{g}\frac{dv_B}{dt} + H_B = H_0 - R_{B-X},$$ Eq. (FC20)

where $v_B$ is the velocity in the pipe AB, $H_B$ is the head loss in the node B in pipe segment AB, and $R_{B-X}$ is the losses between segment B and x within segment BC.

For pipe segment BC:

$$\frac{x}{g}\frac{dv_x}{dt} + H_x = H_B - R_{x-B}$$ Eq. (FC21)

where x is the length of pipe filled with water, $H_x$ is the head in the node BC, $R_{x-B}$ are the losses.

The value x can be determined by the computational engine from the equation $$\frac{dx}{dt} = v_x$$ Eq. (FC22)

The velocities in pipes AB and BC are related by:

$$V_B S_B = v_x S_C,$$ Eq. (FC23)

where $S_B$ is the cross sectional area of the pipe AB, and $S_C$ is the cross-sectional area of pipe BC.

In the system of equations 20-23, the unknowns are as follows: velocities $V_B$, $v_x$, pressure $p_B$ and fluid length x. Commercially available mathematical routines have been employed to determine an approximate solution. One example of such mathematical routine is available from the Microsoft® IMSL MATH/LIBRARY and known as the DASPG routine. Preferably, by using the DASPG routine, the computational engine can find an approximation to the solution of differential algebraic equations with given initial data, while attempting to keep error below a set value.

For the case of fluid flowing towards two branches, fluid flowing from a pipe segment BC to a node having two branches CD and Ci, can be described with equation (FC20), where x is equal to length of pipe BC:

$$\frac{L_C}{g}\frac{dv_C}{dt} + H_C = H_B - R_{C-B}, \quad \text{Eq. (FC24)}$$

where $H_C$ is the head in pipe BC at node C,
$v_C$ is the velocity of fluid in pipe BC.

To describe the filling of branch pipe CD with fluid, the following equations are used:

$$\frac{x}{g}\frac{dv_x}{dt} + H_x = H_C - R_{i-C} \quad \text{Eq. (FC25)}$$

$$\frac{dx}{dt} = v_x, \quad \text{Eq. (FC26)}$$

where x is the distance from C to fluid front in pipe CD.

Similarly, for the branch Ci, the computational engine uses the following:

$$\frac{y}{g}\frac{dv_y}{dt} + H_y = H_C - R_{y-C} \quad \text{Eq. (FC27)}$$

$$\frac{dy}{dt} = v_y, \quad \text{Eq. (FC28)}$$

where y is the distance from C to liquid flow front in the pipe Ci.

For the system of algebraic equations FC24-FC26, a continuity equation can be used to link the flow of fluid into and out of the nodes:

$$v_C S_C = V_x S_D + v_y S_i \quad \text{Eq. (FC29)}$$

where $S_D$ is the cross sectional area of the pipe segment CD, and
$S_i$ is the cross-sectional area of the pipe segment Ci.

In the system of equations FC20, and FC22-FC29 there are eight unknown variables: liquid velocities $V_B$, vC, vx, vy, pressures in nodes pB, pC and location of fluid fronts x, y. Gas pressure in the closed pipe can be calculated by the equation:

$$p_y = p_i(0)\left(\frac{L_i}{L_i - y}\right)^{\gamma_1}, \quad \text{Eq. (FC30)}$$

where $p_c(0)$ is the gas pressure at the moment of fluid front passing the node C,
$L_i$ is the length of pipe $C_i$,
$\gamma_1$ is a variable, which, depending on the relaxation time, is equal to $\gamma$ or 1 for adiabatic or isothermal case, respectively.

If the variables $x=\gamma=0$ in equations 25 and 27, then $h_i=h_D=h_C$ and $P_i=P_D$) and the following formula can be obtained:

$$v_D^2\left(1 + f_D\frac{\Delta l_D}{D_D}\right) = v_i^2\left(1 + f_i\frac{\Delta l_i}{D_i}\right), \quad \text{Eq. (FC31)}$$

Equation 31 together with equation 29 creates algebraic system of equations for calculating initial velocities $V_D$ and $v_i$ based on velocity $v_C$.

For the third case of fluid flowing from a pipe segment CD into a node having three branches $D_m$, $D_F$, and $D_n$, the computational engine can rely upon the following formula, using the same nomenclatures as the first two cases:

$$\frac{L_D}{g}\frac{dv_D}{dt} + H_D = H_C - R_{D-C} \quad \text{Eq. (FC32)}$$

$$\frac{x}{g}\frac{dv_x}{dt} + H_x = H_D - R_{x-D} \quad \text{Eq. (FC33)}$$

$$\frac{dx}{dt} = v_x \quad \text{Eq. (FC34)}$$

$$\frac{y}{g}\frac{dv_y}{dt} + H_y = H_D - R_{y-D} \quad \text{Eq. (FC35)}$$

$$\frac{dy}{dt} = v_y \quad \text{Eq. (FC36)}$$

$$\frac{z}{g}\frac{dv_z}{dt} + H_z = H_D - R_{z-D} \quad \text{Eq. (FC37)}$$

$$\frac{dz}{dt} = v_z \quad \text{Eq. (FC38)}$$

where x, y, z are the respective distances from D to fluid fronts in pipes Dm, DF and Dn.

The computational engine can rely upon a continuity equation to link the flow of fluid towards and outwards of the nodes:

$$v_D S_D = v_y S_m + V_x S_F + v_z S_n \quad \text{Eq. (FC39)}$$

Gas pressure $p_m$, $P_F$, $p_n$ in pipes $D_m$, $D_F$, and $D_n$ can be found from the solution of equation (FC30). Liquid flow can be described by the system of equations 20, 23-26, and 29-39. Initial values for velocities in pipes $D_m$, $D_F$, and $D_n$ can be calculated from equations 33, 35, and 37. Using the following equation, the computational engine can generate system of algebraic equations for calculating initial values of velocities $v_m$, $v_F$ and $v_n$), with a given value of $V_D$.

$$v_m^2\left(1 + f_m\frac{\Delta l_m}{D_m}\right) = v_F^2\left(1 + f_F\frac{\Delta l_F}{D_F}\right) = v_n^2\left(1 + f_n\frac{\Delta l_n}{D_n}\right) \quad \text{Eq. (FC40)}$$

where $f_p$, $f_i$, $f_m$, $f_F$, $f_n$, are Friction coefficient in the respective branches, $\Delta l_D$, $\Delta l_i$, $\Delta l_m$, $\Delta l_F$, $\Delta l_n$, each represents length of respective pipe fraction filled with liquid, and $D_D$, $D_i$, m, $D_F$, $D_n$, each represents respective internal pipe diameter.

Referring to FIG. 3B, the computational engine in process 120 formulates system of equations to determine flow properties, the coordinate of the fluid flow, and the response of the gas and liquid at any point in time as determined earlier in prior processes by relying on suitable mathematical routines such as, for example, Microsoft® DASPG. The routine DASPG relates system variables with the variables of the mathematical routine and provide approximate solution within a user defined error tolerance. In process 122, solutions to the systems of equations that were generated by the process 120 are generated and stored.

Thus, the computational engine, by virtue of processes 114-118, determines the interaction between the fluid moving into the dry pipe system and the removal of gas from the pipe system towards the ambient medium.

To further account for the effects of the interaction between gas and liquid, i.e., the generation of bubbles during the transient duration after the sprinkler trip and before full fluid flow, the computational engine can compute the velocity of the bubbles in the system by first classifying the basic forms of gas-emulsion mixtures in horizontal and sloped pipes are as follows:

1) Bubble form, where separate bubbles are moving along the top of the pipe with slow velocities and low gas concentration.
2) Laminated form, where liquid and gas layers are moving along, having flat or waving boundary with slow velocities and medium gas concentration.
3) Slug Flow, where there is an alternation of gas and liquid plungers.
4) Dispersed Slug Flow form, where there is and alternation of gas plungers containing tiny liquid drops and liquid plungers containing tiny gas bubbles.
5) Dispersed form, where there is rather even distribution of gas bubbles in entire liquid flow with high velocities and low gas concentration.
6) Film-dispersed (circular) form, where gas is moving in jet form in the vicinity of pipe centerline and liquid is moving partly in the film form along the pipe wall and partly in the drop form within the gas medium with high gas concentration and very high velocities.

For the purpose of accounting for bubble velocity, the entire variety of gas-emulsion mixtures is classified into three forms: separated, intermittent, and dispersible. The characteristic parameter for the form of a mixture is the Kutateladze number "K":

$$K = \left[\frac{Fr\rho}{We\Delta\rho}\right]^{1/4} = \frac{U\rho^{1/2}}{(g\sigma\Delta\rho)^{1/4}},\qquad \text{Eq. (FC41)}$$

where $\rho$ is the density of liquid;
U is the velocity of bubbles;
$\Delta\rho$ is the difference in the gas and liquid densities; and
Fr is the Froude number.

The Froude number, which characterizes the tendency of the mixture to separation is given by $$Fr = \frac{U^2}{gD},\qquad \text{Eq. (FC42)}$$

The computational engine also considers the Weber (We) number, which characterizes the tendency of the mixture to get dispersed.

$$We = \sigma/\rho U^2 D \qquad \text{Eq. (FC43)}$$

where $\sigma$=coefficient of surface tension,
U is the bubble velocity, and
D is the diameter of the pipe.

For the Slug flow and Dispersed slug flow forms of flows the velocity of gas phase in the ascending and descending pipes is described as follows:

$$v_g^0 = v(1 \pm |1.64\lambda\psi + 2.15\delta/K^2|^{0.5}),\qquad \text{Eq. (FC44)}$$

where v—velocity of the mixture, $$\psi = 1 + \frac{\beta_g}{(1-\beta_g)K},$$

$\delta = -1$ for descending pipes;
$\delta = 0$ for horizontal pipes;
$\delta = +1$ for ascending pipes;
Negative sign is for $1.6\lambda\psi + 2.15\delta/K^2 < 0$;
$\lambda$, $\beta_g$ are empirical coefficients;
$v_g^0 = 1.18v/K$,
$v_g = v_g^0 |\sin(\theta)|^{1/4}$.
$v_g = v(1 \pm \sqrt{a})$,
$a = 1.6\lambda\psi + 2.15b/K^2$,
$b = c + (1-c)\sqrt{|\sin\theta|}/2.15$,
$c = 1/[1 + \exp((K - \sqrt{f})/0.3\sqrt{f})]$.

For turbulent flow, average bubble diameter d is described in the following formula:

$$\frac{d}{D} = \frac{1.4We^{0.6}}{(1-\varphi)(1 - 0.863\varphi M^{0.15})^{0.4}},\qquad \text{Eq. (FC45)}$$

where D is the pipe diameter;
$\varphi$ is the relative ratio of gas phase; and $$M = \frac{\mu^5 U^3}{D\rho\sigma^4},\qquad \text{Eq. (FC45)}$$

where $\mu$ is the dynamic viscosity of the liquid phase.
Thus, bubbles velocity in vertical pipes can be determined as follows:

$$V_V = 0.351\sqrt{gD} \qquad \text{Eq. (FC47)}$$

For sloped or inclined pipes $$Fr = Fr_H \cos\theta + Fr_V \sin\theta + Q,\qquad \text{Eq. (FC48)}$$

where $\theta$ is the angle of elevation or tilting angle,
$Fr_H$ and $Fr_V$ are Froude Numbers, for horizontal and vertical pipes, respectively, such that $$Q = 0 \text{ if } Fr_H > Fr_V,\qquad \text{Eq. (FC49)}$$

$$Q = 1.37(Fr_V - Fr_H)^{2/3} \sin\theta(1 - \sin\theta) \text{ if } Fr_H < Fr_V. \qquad \text{Eq. (FC50)}$$

From equations 48 to 50, the Froude number can be determined and applied to the following equation so that the bubble velocity U can be determined.

$$Fr = \sqrt{\frac{U^2}{gD}},\qquad \text{Eq. (FC51)}$$

In order to determine the dry pipe valve trip time and the transient time, the computational engine FLOWCALC determines the appropriate equations representing the physical attributes of the dry pipe system. With the appropriate equations set up as presented earlier, FLOWCALC begins solving for the equations of motion of the gas inside the pipe at the moment the dry pipe valve trip to determine the trip time by iteratively solving for the equations of motion of the gas and the changes in gas pressure as the gas escapes through the system over intervals of time. At each time interval during the calculation for trip time, the computational engine accounts for frictional and other losses as the gas escapes from the pipes and nodes through the opened sprinkler head. The solutions to these equations of motion of the fluid are then utilized to determine dry pipe valve trip time, transient time and other results relating to flow velocity and pressure. Thus, the equations were solved by one skilled in the art in conjunction with the system parameters, by converting the equations and parameters into suitable formats compatible with commercially available FORTRAN routines and functions, such as, for example, Microsoft® IMSL Math/Library/DASPG. Preferably, the routine DASPG was used to provide time-based solutions to these equations, which in turn, provided for coordinates of the fluid flow front, fluid flow front velocity and changes in pressure. These results are then provided to output files, which are implemented in a graphical format in an example, as shown in FIG. 2.

A general overview of the underlying mathematics involved in the computational engine PIPEFLOW is discussed below. Specifically, this section states the goal of the computational engine together with (A) the problem of numbering of the system topology components in a tree type piping system; (B) unsteady motion of incompressible liquid/gas systems leading to systems of differential equations; (C) systems of algebraic equations including (D) mass balance equations for at least five specific conditions in the system: (1) compressed gas in the system, (2) fluid motion in the pipe, (3) gas-mass balance, (4) pressure equations, and (5) trapped volume of gas.

PIPEFLOW begins by computing the time it takes for the pressurized gas to escape (i.e., dry pipe valve trip time) by determining the time it takes for the gas pressure in the pipes to reach the trip pressure, as specified by the user. Once the trip pressure is reached, liquid flows into the system through the Feed Main. The liquid pressure at the liquid source can be a constant value or a function of the flow rate from the source. In PIPEFLOW, the gas flow is modeled as either one of an isothermal or adiabatic process.

As fluid fills the pipes, PIPEFLOW computes the position of the liquid front in the pipes and the locations of entrapped gas volumes for purposes of determining which control volume is appropriate for each pipe in the system (i.e., entirely gas-filled, liquid/gas two-phase filling or entirely liquid-filled pipe). As soon as liquid front reaches the inflow node of a pipe, the control volume associated with that pipe is re-evaluated to determine whether the equation for an entirely gas-filled control volume, a liquid/gas two-phase filling control volume or entirely liquid-filled control volume is appropriate. These solution branches also compute the number of entrapped gas volumes in the system after fluid reaches a node. It is sometimes necessary to have internal time step adjustment in order to ensure a stable solution and accurate results.

Two approaches can be used for PIPEFLOW. The first approach forms a determinant system (i.e., equal number of equations to unknowns). The solution procedures include solving for the fluid velocity and/or mass flow rates from the system of Ordinary Differential Equations (ODEs) representative of the momentum balance for each pipe, algebraic relationships derived from mass conservation/balance equations for determining the pressures at each node, and algebraic equations for determining mass flow rates for gas or fluid being depleted through a specified opening in the system.

The second approach in solving for the flow problem can provide more accurate solutions with an attendant increase in complexity. This approach has the advantage in that the structure of the solved equations remains the same, i.e., the number of solved differential equations for velocities and algebraic equations for pressures remains constant. Otherwise, the number of solved differential and algebraic equations constantly varies. This second approach will be described more in detail below after the first approach has been described.

Figure 3C:
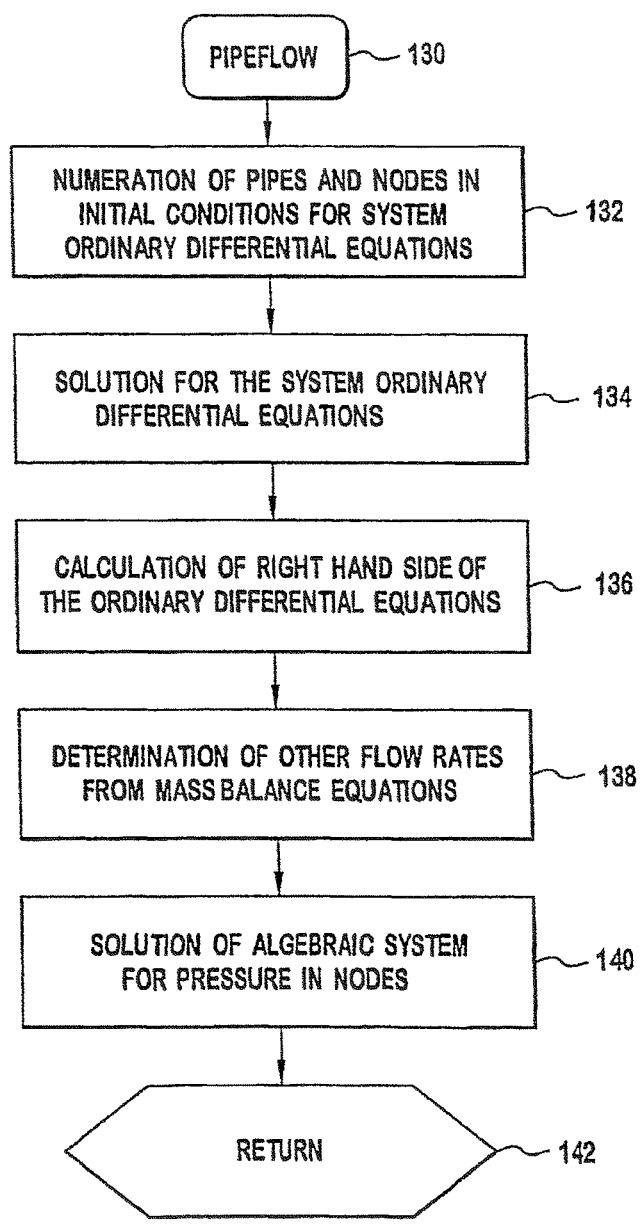
FIG. 3C illustrates in further detail of another subsection of the flow chart of FIG. 3A.

Referring to FIG. 3C, a flow chart of the overall PIPE-FLOW computational engine process is illustrated. After a numerating of the pipes and nodes for a system of ordinary differential equations ("ODE") has completed at 132, PIPE-FLOW proceeds through processes 134-140 in order to solve for the flow rates for each time step. The PIPEFLOW computational engine iteratively solves the equations of motion by repeating processes 134-140 until a solution is found within a prescribed error tolerance. At process 134, an initial or trial velocity and mass flow rate is determined from the ODEs using the pressure terms and loss factors from the previous time step (i.e., the RHS of the momentum balance equations). These trial values for velocity are then used to update the loss factors at process 136. Next, the exit flow rates from the open sprinklers are computed at process 138. The pressures at the nodes are then computed in at process 140 from algebraic equations derived from the mass balance equations. These updated pressure values are then reinserted into the ODEs, and the solution for flow rates via processes 134-140 repeats. The iterative solution process repeats until the solution converges to a set of pressures and flow rates that are in agreement with each other within a prescribed error tolerance. When convergence is reached, the flow properties and pressure for the current time step are outputted and the solution proceeds to the next time step. The convergence can be evaluated by comparing the sum of the outflow rates from a node with a summarized inflow rate to a desired level of tolerance as the solution progresses. Similarly, the convergence can also be evaluated by comparing the pressure values on pipes connected to the same node. Preferably, convergence is considered to have been reached when these values are generally the same up to a predetermined decimal position of the values.

As indicated in FIG. 3C, the PIPEFLOW computational engine is structured to provide (A) a numbering of the dry pipe model in process 132, (B) a system of Ordinary Differential Equations, ODEs, for the topology of the model, (C) an Algebraic System of Equations for pressure at nodes, and (D) Mass Balance Equations for other flow rates in the model.

A generalized back ground on the numeration for the model is discussed herein. It is noted that the velocity $v_i$vi and mass flow rate $m_i$ are linked by relation $$m_i = A_i \rho v_i \qquad \text{Eq. (PF1)}$$

where $$A_i = \pi \frac{D_i^2}{4}$$

is the cross section area of the pipe,
$D_i$ is the diameter, and
$\rho$ the density.

In every pipe the main direction of motion is basically known. It is the direction from Feed Main (FM) to Cross-Main (CM), then from a CM to Branch Line (BL), and from BL through sprigs and drops to open nozzles (NZs). Velocities and flow rates corresponding to these prescribed directions of motion will be considered positive. Velocities and flow rates directed oppositely are negative. Since the considered variants of system are restricted to tree type topologies, the nodes with a merge of two streams are absent and there are only nodes with branching one stream into two.

A particular pipe located between two nodes is designated with subscript i=1, . . . , M, where M is the total number of pipes. For numbering of nodes superscript j, j=1, . . . , N is used, where N is the number of internal nodes (all nodes excluding ends). The two numbers are related by formula:

$$M = 1 + N + K \quad \text{Eq. (PF2)}$$

where K is the number of tee fittings in the system.

The total number of nodes, N, includes the number of tees K. The system with one Feed Main and K tees will have 1+K ends. At the nodes, where liquid is depleted through open nozzles pressures are also unknown. They are linked to atmospheric pressure through some additional formulas (see Table 2 of FIG. 5). Denoting total number of points with unknown pressure as N*=N+1+K, it is apparent that the number of pipes M is equal to the number of nodes with unknown pressure N*. In this case, a one-to-one conformity between indexes of pipes and nodes is established.

At the first approximation, pipes leading to closed sprinklers (these are sprigs and drops) can be excluded from consideration. Using this approach it is assumed that: (a) the mass flow rate in this branch is generally equal to zero, and (b) the pressure drop is equal to zero for horizontal pipe and is determined by static pressure drop for inclined pipe. This approach considerably decreases the number of equations to be solved without essential loss of accuracy. Nevertheless, these sprigs and drops will be analyzed by the computational engine as described below in this section.

Governing equations can be generated by considering a simplified case of unsteady motion of an incompressible fluid in a tree type system. Next, the analysis can be extended to the case of the presence of moveable air-liquid boundaries.

Typical momentum balance equation for movement of incompressible fluid along i-th pipe is as follows:

$$\rho h_i \dot{v}_i = \quad \text{Eq. (PF 3a)}$$

$$P^{jL} - P^{jR} - \frac{f_i h_i}{D_i}\frac{\rho v_i^2}{2} - \frac{f_i h_{iL}}{D_i}\frac{\rho v_i^2}{2} - \frac{f_i h_{iR}}{D_i}\frac{\rho v_i^2}{2} - \rho g h_i \sin\alpha$$

or transitively:

$$\frac{h_i}{A_i}\dot{m}_i = \quad \text{Eq. (PF 3a)}$$

-continued $$P^{jL} - P^{jR} - \frac{f_i h_i}{D_i}\frac{\rho v_i^2}{2} - \frac{f_i h_i}{D_i}\frac{\rho v_i^2}{2} - \frac{f_i h_{iR}}{D_i}\frac{\rho v_i^2}{2} - \rho g h_i \sin\alpha$$

where $$\dot{v}_i = \frac{dv_i}{dt}$$

is the time derivative or velocity, $$\dot{m}_i = \frac{dm_i}{dt}$$

is the time derivative of mass flow rate,
$h_i$, $D_i$ are the length and diameter of i-th pipe, respectively;
$f_i$ the friction factor, and
$h_{iL}$ and $h_{iR}$ are the equivalent lengths responsible for local pressure drops at the left and right ends of pipe, sin $\alpha$ is a pitch.

(As depicted in Table 2, Pressure drops at the entrance and at the end of pipe include losses due to fitting, turn of the flow etc. Pressures $P^{jL}$ and $P^{jR}$ are located at the left and right sides of the pipe, accordingly. Furthermore, pressure $P^{jR}$ is located in the branching point. Local pressure drops due to tees are located to the right of branching point, at the beginning of the next two pipes starting from this point. Equation (3) can also include a local hydrodynamic resistance at the right end of the pipe, $$\frac{f_i h_{iR}}{D_i}\frac{\rho v_i^2}{2},$$

which is located before branching, that is to the left of branching point of two flows. This resistance can be originated, for instance, from fitting losses at the entrance of tee.

It should be noted that all the terms in the RHSs of equations (PF3) are known except for pressures $P^{jR}$ and $P^{jL}$. For the velocity $v_1$, differential equation (3a) is created, so for the task of calculation of the RHS in this equation the value $v_i$ is assumed to be known. The same is true for the mass flow rates $m_i$ in equations (PF3b).

For determination of pressures $P^j$, j=1, . . . , N, the conditions of mass flow rates balance in every internal point of the system can be enumerated as follows:

$$m_{i1(j)} = m_{i2(j)} + m_{i3(j)}, j=1, \ldots, N \quad \text{Eq. (PF4)}$$

For every internal node j the numbers of pipes connected to the left side of the node i1(j) and to the right side of the node i2(j), i3(j) are prescribed. In a particular case, when only two pipes join in the node one of the flow rates will be zero $m_{i3(j)}=0$. The relations between the numbers of nodes and pipes, which are the functions i1(j), i2(j), i3(j) is formulated below.

All the open ends of the system (open sprinklers) provide additional algebraic relations between pressure in these points $P_j$, air pressure ahead of a nozzle $P_a$, ambient pressure $P_\infty$, and mass flow rate $m_a$, thus describing the laws of fluid flowing out through open nozzles. For air discharging from the nozzle these relations are of the type:

$$m_a = \left[\frac{g\gamma}{RT_a}\left(\frac{2}{\gamma+1}\right)^{(\gamma-1)/(\gamma+1)}\right]^{1/2} A_a P_a \qquad \text{Eq. (PF5a)}$$

for $P_\infty / P_a < 0.528$ or $$m_a = \left[\frac{2g\gamma P_a}{RT_a(\gamma-1)}\left(\left(\frac{P_\infty}{P_a}\right)^{\frac{2}{\gamma}} - \left(\frac{P_\infty}{P_a}\right)^{\frac{\gamma+1}{\gamma}}\right)\right]^{1/2} A_a \qquad \text{Eq. (PF5b)}$$

for $P_\infty / P_a \geq 0.528$, where $A_a$ is the cross section area of opening,
$\gamma = c_p/c_V$, g is the acceleration due to gravity constant,
R is the universal gas constant,
$P_\infty$ and $P_a$ are ambient pressure and air pressure in the system ahead of the nozzle.

For fluid discharging from the system the additional equation describing opening is:

$$A_a v_a \rho = f(P_a, P_\infty, A_a, A_T) \qquad \text{Eq. (PF5.1b)}$$

where $A_a$ is the cross section area of the nozzle,
$A_T$ is the cross section area of the throttle,
$v_a$ is the fluid velocity at the entrance of the nozzle,
$P_a$ is the pressure at the entrance of the nozzle.

For the purpose of describing this pressure drop the following formula can be used instead:

$$A_a v_a = k_D K_F (P^*_a - P_\infty)^{1/2}, \qquad \text{Eq. (PF5c)}$$

where $K_F$ is the K-factor (dimensional value),
$k_D$ is the coefficient depending on measurement system unit,
$P^*_a$ is the total internal pressure ahead of the nozzle (that is a static pressure plus dynamic head), and
the values of $K_F$ depend on geometry of the nozzle.

Algebraic equations (PF4) together with N differential equations (PF3b) and 1+K, additional algebraic equations (PF5a, b, c) written for each end node form a closed mathematical system for determination of M mass flow rates at every pipe and N*=M pressures at every node.

Algebraic system for determination of unknown pressures can be obtained by the following way. Equation (PF4) can be differentiated over time to give the following:

$$\dot{m}_{i1(j)} = \dot{m}_{i2(j)}) + \dot{m}_{i3(j)}, j=1, \ldots, N \qquad \text{Eq. (PF6)}$$

The RHSs of equations 3b can be substituted here. An algebraic relation which ties pressures in four different nodes for the case of tees and pressure in three different nodes can be obtained for the case of two pipes fitting. Considering, for example, the latter case, we obtain:

$$\frac{A_{i1}}{h_{i1}}\left(P^{jL(i1)} - P^{jR(j1)} - \frac{f_{i1}h^*_{i1}}{D_{i1}}\frac{\rho v^2_{i1}}{2} - \rho g h_{i1}\sin\alpha_{i1}\right) = \\ \frac{A_{i2}}{h_{i2}}\left(P^{jL(i2)} - P^{jR(j2)} - \frac{f_{i2}h^*_{i2}}{D_{i2}}\frac{\rho v^2_{i2}}{2} - \rho g h_{i2}\sin\alpha_{i2}\right) \qquad \text{Eq. (PF7)}$$

where equivalent lengths $h^*_{i1}$, and $h^*_{i2}$ were introduced in such a way that $$\frac{f_{i1}h^*_{i1}}{D_{i1}} = \frac{f_{i1}h_{i1}}{D_{i1}} + \frac{f_{i1}h_{i1L}}{D_{i1}} + \frac{f_{i1}h_{i1R}}{D_{i1}} \text{ and}$$

$$\frac{f_{i2}h^*_{i2}}{D_{i2}} = \frac{f_{i2}h_{i2}}{D_{i2}} + \frac{f_{i2}h_{i2L}}{D_{i2}} + \frac{f_{i2}h_{i2R}}{D_{i2}}$$

Taking into account that jL(i2)=jR(i1) and denoting the pressure at this central node as $P^{jL(i2)}=P^{jL(i1)}=P_C$ and the pressures at the left and right neighboring nodes as $P^{jL(i1)}=P_L$ and $P^{jL(i2)}=P_R$, a three-point algebraic equation for pressures is obtained:

$$\frac{A_{i2}}{h_{i2}}P_R - \left(\frac{A_{i2}}{h_{i2}} + \frac{A_{i1}}{h_{i1}}\right)P_C + \frac{A_{i1}}{h_{i1}}P_L = F_{i1} - F_{i2}, \qquad \text{Eq. (PF8)}$$

where the following was denoted for brevity $$F_{i2} = \frac{A_{i2}}{h_{i2}}\left(\frac{f_{i2}h^*_{i2}}{D_{i2}}\frac{\rho|v_{i2}|}{2}v_{i2} + \rho g h_{i2}\sin\alpha_{i2}\right) \text{ and}$$

$$F_{i1} = \frac{A_{i1}}{h_{i1}}\left(\frac{f_{i1}h^*_{i1}}{D_{i1}}\frac{\rho|v_{i1}|}{2}v_{i1} + \rho g h_{i1}\sin\alpha_{i1}\right).$$

Here, the squared velocity was replaced by the product of absolute value of velocity to the velocity itself. After this correction, the terms $$\frac{f_{i2}h^*_{i2}}{D_{i2}}\frac{\rho|v_{i2}|}{2}v_{i2} \text{ and } \frac{f_{i1}h^*_{i1}}{D_{i1}}\frac{\rho|v_{i1}|}{2}v_{i1}$$

have proper signs of friction losses for negative direction of velocity in a pipe.

In the case of three pipes joining in a node (Table 2) the equation of unsteady mass flow rates balance (PF8) takes the form $$\frac{A_{i2}}{h_{i2}}P_R + \frac{A_{i3}}{h_{i3}}P_U - \left(\frac{A_{i3}}{h_{i3}} + \frac{A_{i2}}{h_{i2}} + \frac{A_{i1}}{h_{i1}}\right)P_C + \frac{A_{i1}}{h_{i1}}P_L = \\ F_{i1} - F_{i3} - F_{i2} \qquad \text{Eq. (PF9)}$$

where $P_U = P^{jR(i3)}$ is the pressure at the right end of pipe i3, and $$F_{i3} = \frac{A_{i3}}{h_{i3}}\left(\frac{f_{i3}h^*_{i3}}{D_{i3}}\frac{\rho|v_{i3}|}{2}v_{i3} + \rho g h_{i3}\sin\alpha_{i3}\right). \qquad \text{Eq. (PF10)}$$

The case of gas being present in the system is more complicated in comparison with the pure liquid case discussed above. Thus, the mathematical description of the problem can be changed to accommodate this case. These changes concern, first, the equation of motion in a pipe. Second, the equation of mass balance in a node should also be modified. Third, additional equations of gas mass balance must be added to the set of equations solved. These equations of gas mass balance should be written for every volume of trapped air. They are needed for determination of position of liquid-air interface. And, fourth, an equation of state is necessary for linking pressure and air density.

The equation of state for volume of trapped air can be written either in adiabatic or isothermal approach. It is believed that a common approach consists in using ideal gas equation, which, of course, is suitable for air with sufficient accuracy. The ideal gas equation contains temperature, and thus requires the calculation of temperature field in the whole system. Hence, this approach requires additional information such as the ambient condition and other temperature conditions.

If supposing that the process of entrapped gas compression can occur by isothermal or adiabatic manner, the temperature is not included into equation of state, and the thermal problem may not be solvable.

At isothermal, i.e., an infinitely slow process of gas compression, the temperature is constant and equal to ambient temperature. Adiabatic process represents other extreme case of a very fast compression of gas at which heat exchange with an environment is insignificant. Whether the process involves an adiabatic or isothermal process, such process will be considered in the analysis.

The first law of thermodynamics can be represented by the following equation:

$$\Delta U = Q - A$$

It is possible to say, that a process is close to isothermal, if the relation of heat and work is $$\frac{|Q|}{|A|} \gg 1 \qquad \text{Eq. (PF11)}$$

In an opposite case, the process of gas compression can be considered to be adiabatic:

$$\frac{|Q|}{|A|} \ll 1, \qquad \text{Eq. (PF12)}$$

An assumption is made that the process is adiabatic. In such case, the equation of state is $$P\rho^{-\gamma} = \text{const} \qquad \text{Eq. (PF13)}$$

where $\gamma = C_p/C_v \approx 1.41$ for air.

The ideal gas equation of a state can be written as $$\frac{P}{\rho} \propto T \qquad \text{Eq. (PF14)}$$

where T is the absolute temperature measured in Kelvin degrees.

Eliminating pressure in equations (13) and (14), the following equation is obtained:

$$\rho^{1-\gamma} T = \text{const} \qquad \text{Eq. (PF15)}$$

Differentiating equation (15) and replacing differentials with final increments provide for the following equation:

$$(1-\gamma)\rho^{-\gamma}\Delta\rho T + \rho^{1-\gamma}\Delta T = 0 \qquad \text{Eq. (PF16)}$$

It follows that $$\Delta T = (1-\gamma)\frac{\Delta\rho}{\rho}T \qquad \text{Eq. (PF17)}$$

The average change of gas temperature in a process can be estimated as $$\langle \Delta T \rangle = \frac{1}{2}\Delta T.$$

Assuming that at the initial moment, the temperature of gas is equal to environment temperature, an estimate of average gas temperature being excess over the environment temperature can be given as:

$$\langle \Delta T \rangle = \frac{1}{2}(1-\gamma)\frac{\Delta\rho}{\rho}T \qquad \text{Eq. (PF18)}$$

Because of change of volume, the density also changes, which means that within the length of that part of pipe, gas is present, i.e.

$$\left|\frac{\Delta\rho}{\rho}\right| = \left|\frac{\Delta L}{L}\right| \qquad \text{Eq. (PF19)}$$

Assuming that $\Delta L = v\Delta t$, where v is velocity of movement of the interface liquid-gas, and $\Delta t$ is time of movement, the following equation is obtained:

$$\frac{\Delta\rho}{\rho} = \frac{v\Delta t}{L} \qquad \text{Eq. (PF20)}$$

Substituting (20) in (18) leads to:

$$\langle \Delta T \rangle = \frac{1}{2}(1-\gamma)\frac{(v\Delta t)}{L}T \qquad \text{Eq. (PF21)}$$

Assuming that the environment temperature $T_\infty = 300K$ as the temperature is included in the estimation. Then equation 21 becomes $$\langle \Delta T \rangle = \frac{1}{2}(1-\gamma)\frac{(v\Delta t)}{L}T_\infty \qquad \text{Eq. (PF22)}$$

For estimation of the value of heat Q, the assumption is that heat is transferred through a lateral surface of cylindrical tube, which area S is provided by:

$$S = L\pi D \qquad \text{Eq. (PF23)}$$

It is possible to take the value, characteristic for a free convection from the horizontal cylinder heated up in air surrounding as the heat-transfer coefficient $\alpha$ through a lateral surface of a cylindrical tube:

$$\alpha = 5 \qquad \text{Eq. (PF24)}$$

Using equations (22)-(24) results in $$Q = \alpha S \langle \Delta T \rangle \Delta t = \alpha L\pi D \langle \Delta T \rangle \Delta t = \alpha L\pi D \frac{1}{2}(1-\gamma)\frac{(v\Delta t)}{L}T_\infty \Delta t \qquad \text{Eq. (PF25)}$$

An estimate on the work done being at compressing the gas is shown by the following equation.

$$A = p\Delta V = p\Delta L \frac{\pi D^4}{4} = p(v\Delta t)\frac{\pi D^4}{4} \qquad \text{Eq. (PF26)}$$

The ratio $$\frac{|Q|}{|A|}$$

can be formed and further providing $$\frac{|Q|}{|A|} = \frac{\alpha L \pi D \frac{1}{2}(1-\gamma)(v\Delta t)T_\infty \Delta t}{p(v\Delta t)\frac{\pi D^2}{4}L} = \qquad \text{Eq. (PF27)}$$

$$\frac{2\alpha(1-\gamma)T_\infty \Delta t}{pD} = \frac{250.4300\Delta t}{2 \cdot 10^5 5 \cdot 10^{-2}} = 0.12\Delta t$$

Supposing $\Delta t \square 1$ sec., an estimation of the ratio $$\frac{|Q|}{|A|} = 0.12.$$

Alternatively, supposing $$\Delta t = \frac{\Delta L}{v} \approx \frac{L}{v},$$

$L\square 1$, $v\square 1$, thereby resulting in the same estimation. This estimation shows that the case of isothermal compression of gas is really a basic one. At the same time it is possible to pick up such values of parameters in (25) at which this estimation becomes disputable. Since two extreme processes, indefinitely fast, i.e. adiabatic $p\rho^{-\gamma}$=const, and indefinitely slow, i.e isothermal $p\rho^{-1}$=const, are represented by similar expressions with only the exponent at p differing, in the program it is possible to create the formula for general process by assuming $$p\rho^{-(\varepsilon+(1-\varepsilon)\gamma)}=\text{const}, \qquad \text{Eq. (PF28)}$$

where $\varepsilon=|Q|/|A|$ is the ratio of heat and work, estimated on the basis of formula (25).

Expression (PF28) goes to formula for adiabatic process at $\varepsilon=0$ and to formula for isothermal process at $\varepsilon=1$. Thus, changes should be made accordingly for a description of a two-phase flow.

Assuming that a liquid with density $\rho$ flows along a part of pipe L and a gas with average density $\rho_g$ flows along the other part $L_g=h_i-L$ of the same pipe. An equation of the motion of the fluid for this pipe partially filled with liquid can be derived as follows.

A common integral equation of motion for volume V bounded by surface a looks as follows $$\frac{\partial}{\partial t}\int_V \rho v dV + \int_\sigma \rho v v_n d\sigma = \int_V \rho F dV + \int_\sigma P_n d\sigma \qquad \text{Eq. (PF29)}$$

where F is the vector of acceleration caused by external forces, $P_n$ the vector of stresses due to action of surface forces at boundary σ.

For our case, equation (29) becomes:

$$h_i A_i \frac{\partial}{\partial t}(\rho_\Sigma v_i) + A_i v_i^2 (\rho_g - \rho) = \qquad \text{Eq. (PF30)}$$

$$h_i A_i \rho_\Sigma g \sin\alpha_i - A_i \frac{f_i h_i^*}{D_i} \frac{\rho_\Sigma v_i^2}{2} - A_i(P^i - P^{iL})$$

where $i_L(i)$ is the index of a node situated tom the left from node i, $$\rho_\Sigma = \rho \frac{L}{h_i} + \rho_g \frac{L_g}{h_i}$$

is a total density at the pipe.

According to numeration rules, an index of pipe i coincides with the index of the node at the right side of the node, and taking into account that $$\frac{d\rho_\Sigma}{dt} = \frac{\rho}{h_i}\frac{dL}{dt} - \frac{\rho_g}{h_i}\frac{dL}{dt} = \frac{v}{h_i}(\rho - \rho_g)$$

equation (PF30) becomes $$h_i \rho_\Sigma \dot{v}_i = P^{iL} - P^i - h_i \rho_\Sigma g \sin\alpha_i - \frac{f_i h_i^*}{D_i}\frac{\rho_\Sigma v_i^2}{2} \qquad \text{Eq. (PF31)}$$

It means that the equation for a pipe with moving boundary liquid-gas looks the same as corresponding equation (PF3a) for liquid except for density of liquid being replaced with the average total density $\rho_\Sigma$.

For gas flowing along the entire pipe, the equation of motion is slightly different from that of fluid by the presence of additional term $$-\frac{\partial}{\partial x}(\rho_g v^2)$$

in the right hand side in equation PF31a.

$$h_i \rho_g \dot{v}_i = P^{iL} - P^i - \frac{f_i h_i^*}{D_i}\frac{\rho_g v_i^2}{2} - \rho_g g h_i \sin\alpha_i - \left((\rho_g v^2)^i - (\rho_g v^2)^{iL}\right) \qquad \text{Eq. (PF31a)}$$

There are two ways of formulating the equations for gas. First, a more simple approach uses the proposal that there are no any pressure drops along all the parts of mains filled with gas. It is the consequence of small density of gas as compared with that of water. This case can be obtained from equations (PF31), (PF31a) by supposing $\rho_g$=0. The last term in (PF31a) should also be omitted since there is a small variation of pressure along a pipe filled with gas. This term becomes significant for fast processes like flow with sonic velocity, shock waves, etc. With account of what was said $h_i\rho_\Sigma \approx Lp$, and equation of motion (PF31) for a pipe partially filled with liquid is as follows:

$$L\rho\dot{v}_i = P^{iL} - P^i - \frac{f_i h_i^*}{D_i}\frac{L}{h_i}\frac{\rho v_i^2}{2} - \rho g L\sin\alpha_i \qquad \text{Eq. (PF32)}$$

where $h^*_i$ should also be modified considering the fact that only a part of the pipe is filled with liquid.

In particular, if L=0 in (PF32), this equation becomes $$P^{iL} - P^i = 0 \qquad \text{Eq. (PF33)}$$

Equation (PF33) means that the pressure is uniform everywhere in entrapped gas volume. It should be noted that within the second approach, which can be more accurate and more complex, the proposal on uniform gas pressure is not used, as the following equation (PF34) is written for every pipe. This approach has the advantage, that the structure of the solved equations remains the same, i.e., the number of solved differential equations for velocities and algebraic equations for pressures remains constant. Otherwise, the number of solved differential and algebraic equations constantly varies. For example, differential equation (PF32) transforms to algebraic equation (PF33).

$$h_i\rho_\Sigma \dot{v}_i = P^{iL} - P^i - \frac{f_i h_i^*}{D_i}\frac{\rho_\Sigma v_i^2}{2} - \rho_\Sigma g h_i \sin\alpha_i \qquad \text{Eq. (PF34)}$$

Time steps in solution of differential equations have to be taken in such a manner, that formation of new volumes of entrapped gas would coincide with the beginning of the next time step. It enables one to determine initial mass of gas and also its initial pressure and density, which are required for subsequent consideration of gas compression according to equation of state. Thus, the moment of formation of new entrapped gas volume and blocking of a new pipe demand an accurate adjustment the computing of the solution of ordinary differential equations. On each new time step there is a possibility to redefine the structure of solved equations, so it does not create special problems, besides an increase in the complexity of the program.

For a gas volume with open sprinklers the value of gas pressure in this volume is related to atmospheric pressure $P_\infty$ by formulas (PF5a-5b). In any case, for gas volumes with or without open sprinklers, the pressure is determined by instantaneous value of gas mass in this volume and equation of state. Gas mass balance for a particular gas volume with index k is given by differential equation $$\dot{M}_k = -\Sigma M_\alpha \qquad \text{Eq. (PF35)}$$

with the initial condition $$M_k|_{t=t_0} = M_{k0} \qquad \text{Eq. (PF36)}$$

where $\Sigma m_\alpha$ is the sum of all mass flow rates determined by formulas (PF5a-5b) for all open sprinklers belonging to k-th isolated volume of gas, $M_{k0}$ is the initial mass of gas in k-th volume at the moment of this volume creation, which is at the moment when this part of system becomes isolated from other gas contained in the system.

At the moment when calculation starts, there is only one such gas volume. It is the volume of the whole system. Further this volume starts to be divided into separate isolated parts, for each of them, equations (PF35) and (PF36) is written down. The position of the boundary fluid-gas, which is known at the initial moment of formation of new isolated volume, can be found at any subsequent moment on the current value of mass of gas $M_k$ in k-th isolated volume, its density, which can be found on the initial pressures and density and a current pressure. The every moment of a new isolated volume formation should be fixed in computing, and then the described above procedure is repeated.

Requirement of mass flow rates balance in a node and differential equation of mass flow rates (PF6) can be modified in view of two-phase nature of medium. In a more simple approach, at which a pressure in particular isolated volume occupied with gas is considered constant, there is no necessity to write down the equation (PF6) for nodes, surrounding to three or two pipes completely filled with gas. Such a node is one filled with gas, and a continuity equation is not used for a 'gas' node in this approach. Equation (PF6) is written down only in the event if two or three pipes flanking to the node is filled with fluid. In this case, the node itself is filled with fluid, and equations (PF6) and (PF8) are written, as earlier, for the mass balance of fluid.

Equation (PF9) can be updated for a node filled with liquid. In this case the condition of mass balance is written for liquid only. Equation (PF34) in form (PF3b) becomes:

$$\frac{h_i}{A_i}\frac{\rho_\Sigma}{\rho}\dot{m}_i = P^{iL} - P^i - \frac{f_i h_i^*}{D_i}\frac{\rho_\Sigma v_i^2}{2} - \rho_\Sigma g h_i \sin\alpha_i \qquad \text{Eq. (PF37)}$$

where $m_i = \rho v_i A_i$.

Neglecting gas density, the following can be made:

$$\rho_\Sigma h_i \approx \rho L \qquad \text{Eq. (PF38)}$$

such that the ratio $$\frac{\rho_\Sigma}{\rho}$$

in (34) is approximately equal to $$\frac{L}{h_i}$$

With an accounting of equation (PF38), the equation (PF37) for a pipe partially filled with liquid becomes $$\frac{L_i}{A_i}\dot{m}_i = P^{iL} - P^i - \frac{f_i h_i^*}{D_i}\frac{\rho_\Sigma v_i^2}{2} - \rho g L_i \sin\alpha_i \qquad \text{Eq. (PF39)}$$

Hence, equation (PF9) in a more general case becomes $$\text{Eq. (PF40)}$$
$$\frac{A_{i_R}}{h_{i_R}}P^{iR} + \frac{A_{i_U}}{h_{i_U}}P^{iU} - \left(\frac{A_{i_R}}{h_{i_R}} + \frac{A_{i_U}}{h_{i_U}} + \frac{A_i}{h_i}\right)P^i + \frac{A_i}{h_i}P^{iL} = F_i - F_{i_U} - F_{i_R}$$

where instead of symbolic designations of pipes with letters i1, i2, i3 the corresponding values of single index i, $i_R$ (i), $i_U$ were substituted.

According to developed numeration rules the indexes of nodes coincide with indexes of pipes lying ton the left of this node. So, instead of using symbolic designations of nodes L, C, R, U in (37) the superscripts $i_L$, (i), i, $i_R$(i), $i_U$(i) are used. The functions in RHS of equation (PF40) are:

$$F_j = \frac{A_j}{h_j}\left(\frac{f_j h_j^*}{D_j}\frac{\rho|v_j|}{2}v_j + \rho g h_j \sin\alpha_j\right), \ j = i, i_R, i_U \quad \text{Eq. (PF41)}$$

An accounting of the number of unknown variables for entrapped volume of gas and the number of equations for their determination should indicate that they are equal. In particular, the unknown variables are mass of gas in volume $M_k$, gas pressure $P_g$, gas density $P_g$, and position of interface L.

For their determination the following equations are involved: (a) differential equation (PF35) with initial condition of equation (PF36), (b) mass of gas been represented through volume $M_k$ in equation (PF42), (c) equation of state (26) with the initial data $P_{|t=t_0}=P_0$, $\rho_{|t=t_0}=\rho_0$, where the moment $t_0$ is the moment of formation of k-th isolated volume, and equation $\dot{L}=v_i$, or in integrated form of equation (PF43) as follows:

$$M_k = \sum_i \rho_g \frac{\pi D_i^2}{4} L_i \quad \text{Eq. (PF42)}$$

$$L_i = v_i(t - t_0) \quad \text{Eq. (PF43)}$$

The above four equations can solve the problem of determining the unknown variables in entrapped gas volume. Additionally, there is algebraic equation (PF40) connecting gas pressure $P_R=P_C=P_U=P_g$ with the pressure in the previous node $P_L$. This equation is necessary for determination of $P_L$ in the corresponding momentum equation (PF32) for i-th pipe.

According to the above written equations, each trapped volume of gas is considered to be isolated from other such volumes. If there are open sprinklers in this volume, the gas leaves through them to an atmosphere. However, it is necessary to emphasize that according to the given statement of the problem, the flow of closed gas through the border liquid-gas is not provided. It is considered, instead, that the system has such a configuration, that there are no bubbles flowing from entrapped volumes of gas and their subsequent travel along the system. It is believed that the prediction of the emersion of bubbles from closed volumes of gas disposed within inclined pipes under buoyant forces and their subsequent travel along a general pipeline system is extremely difficult. That is, it is believed that the prediction of such flow modes may be solved based on precise assumptions and data obtained for a concrete configuration or for a family of similar configurations of a pipeline system.

In an alternative approach, the assumption of the constant gas pressure in the pipes where there is a gas is not used. Instead, equation (PF34) is solved for all pipes. In so doing it is necessary to know an effective density $\rho_\Sigma$. For the purpose in their turn, the values of $L_i$, and $\rho_g$ for each instant of time and for all pipes must be determined. Gas density $\rho_g$ is determined from the equation of state:

$$\rho_g^{-(\varepsilon+(1-\varepsilon)\gamma)} = \frac{P_0}{P}\rho_{g_0}^{-(\varepsilon+(1-\varepsilon)\gamma)} \quad \text{Eq. (PF44)}$$

where values of $P_0$ and $\rho_{g_0}$ are registered at the moment of k-th isolated volume creation.

At this moment, the existence of the isolated volume of gas, for which the given tube belongs, is divided into two. For definition of $\rho_{g_0}$ it is necessary to subdivide the current mass of gas in existing gas volume proportionally to new gas volumes, and originating at the division of this volume in two. Then, during the evolution of the created volume, the current density of gas $p_g$ for each pipe belonging to this new volume, is evaluated on the given mean pressure $P=(P^{i_L}+P^i)/2$ in the tube according to equation (PF44)

Similar to the first approach, the solution of a system of ordinary differential equations is constructed in such a manner that at the moment of new trapped gas volume creation there is a stop in computation. It happens at the moment when the front of a liquid reaches the new T-bend in the system. Following topology of the system the first pipes of two new volumes flanking to this node are known. These are the pipes where the boundaries liquid-gas will be located at prolongation of computation. Such pipes should be registered as ones with two-phase flow. The number of such pipes will constantly increase with time. In such marked pipes the value of $L_i$, is calculated according to formula $$L_i = \int_0 v_i dt \quad \text{Eq. (PF45)}$$

where $t_0$ is time of creation of the given isolated volume.

The requirement of mass flow rate balance may be replaced with a more common requirement of volume flow rate balance in a node $$A_i v_i = A_{i_R} v_{i_R} + A_{i_U} v_{i_U} \quad \text{Eq. (PF46)}$$

For node filled with liquid, the relation (PF46), being multiplied by liquid density, will give a condition of mass flow rate balance for liquid. For gas node the given condition is equivalent to a requirement of gas mass balance.

For three tubes joining node i, the equations of motion are as follows:

$$h_i \rho \Sigma i \dot{v}_i = P^{iL} - P^i - F_i,$$

$$h_{i_R} \rho \Sigma i_R \dot{v}_{i_R} = P^i - P^{iR} - F_{i_R},$$

$$h_{i_U} \rho \Sigma i_U \dot{v}_{i_U} = P^i - P^{iv} - F_{i_U}, \quad \text{Eq. (PF47)}$$

Substituting equations of motion (PF47) to the volume flow rate balance (PF46), we have an analog of four point equation (PF41) in the following equation:

$$\frac{A_{i_R}}{\rho_{\Sigma i_R} h_{i_R}} P^{iR} + \frac{A_{i_U}}{\rho_{\Sigma i_U} h_{i_U}} P^{iU} - \\ \left(\frac{A_{i_R}}{\rho_{\Sigma i_R} h_{i_R}} + \frac{A_{i_U}}{\rho_{\Sigma i_U} h_{i_U}} + \frac{A_i}{\rho_{\Sigma i} h_i}\right) P^i + \\ \frac{A_i}{\rho_{\Sigma i} h_i} P^{iL} = \frac{F_i}{\rho_{\Sigma i}} - \frac{F_{i_U}}{\rho_{\Sigma i_U}} - \frac{F_{i_R}}{\rho_{\Sigma i_R}} \quad \text{Eq. (PF48)}$$

To keep the number of solved differential equations constant, equations (PF35) for the current mass of gas in each isolated volume are replaced with their integral forms. A current mass of gas in the volume is calculated from integral equation:

$$M_k = \int_0 \Sigma m_\alpha dt \quad \text{Eq. (PF49)}$$

The current volume of liquid in the system may be obtained from equation $$V_f = \int_{t_r} N_1 A_1 dt \qquad \text{Eq. (PF50)}$$

where $t_r$ is equal to trip time moment.

Each of the above computational engines FLOWCALC and PIPEFLOW has been verified for their accuracy by comparing their ability to predict the characteristics of known model of referential dry pipe systems against the actual characteristics of the known referential dry pipe systems.

In order to determine the correlation between actual and modeled systems, at least eight test cases were modeled after the pipe systems constructed by Factory Mutual Research Corporation (FMRC) for purposes of generating experimental data for trip and transit times for various pipe topologies as described in the FMRC Technical Report "*Water-Delay-Time Measurements for Selected Gridded Dry Pipe Sprinkler Systems*," FMRC J.I. 0Z2R5.RS, September 1999 (hereafter "FMRC Report"). Each of the systems is configured with a dry pipe valve, twelve sprinkler heads with twelve branch lines connected by two cross mains, which are connected by two connection pipes. Details of the configurations, methodology and parameters defining the FMRC experiments are provided in the FMRC Report. For the dry pipe trip time verification, at least three pipe systems modeled in FLOWCALC and PIPEFLOW are identified as test cases A, B, and C as described below in Table 2. For the transit time verification, four test cases, identified as the test cases A4, B4, C4, and an additional test case D4 are described in Table 4A. And although eight referential systems were tested with 4-inch and 8-inch risers (A4, B4, C4, D4 and A8, B8, C8 and D8), only four (A4, B4, C4, D4) are described for the sake of brevity.

In particular, the actual test systems are for a 4 in. riser for four different configurations (hereinafter referred to as referential test cases A4, B4, C4, D4 to identify the 4-inch risers in the system) of the above system layout of a tree-type system (i.e., a system having a branch line connected by a single main feed) that were constructed from a grid-type system test apparatus (i.e., cross mains connecting multiple branch pipes), shown here as FIGS. 1, 4A, 4B, and 4C, respectively. The actual test systems were all constructed in accordance with a "base" tree type system having 12 1¼ in. branch pipes ($b_1$, $b_2$, $b_3$, $b_4$, $b_{12}$) and two 4 in. cross-mains ($CM_1$ and $CM_2$). The base system has an array of first through twelve generally parallel branch pipes ($b_1$, $b_2$, $b_3$, $b_4$, $b_{12}$) arranged generally on a first horizontal plane located approximately 14 feet and 4 inches above a floor. The first branch line located proximate a first end of the array and a twelfth branch line located proximate the second end of the array. Each of the branch pipes defines a pipe having an internal diameter of approximately 1.25 inches and having a ball valve located proximate at a midpoint of each branch line. The ball valve has an internal diameter of approximately 1.25 inches with a flow coefficient of approximately 120 gallons per minute flow per a square root of flow pressure in pound per square inch gauge ($gpm/psig^{1/2}$). Branch pipes were spaced 8 ft. 9 in. apart between pipe center lines and located 28 in. above the cross-mains $CM_1$ and $CM_2$, as measured from branch line and cross main center lines. A conversion from the general, grid-type system of the test apparatus to the tree-type system for running the experiments data was accomplished by closing ball valves located on the branch line riser as well as butterfly valve on the Cross Main. A ball valve BV of approximately 1¼ in. diameter was installed on each branch line riser. The K-factor value for the valve was 120 gallon per minute divided by the square root of pound per square inch ($gpm/psi^{1/2}$). The ball valve BV was located 14 in. above the top of the cross main $CM_1$. Ball valves of the same type and size were also installed proximate the midpoint of individual branch pipes.

The first and second cross mains $CM_1$ and $CM_2$ are spaced from the plane and extending in a direction generally orthogonal to the branch pipes. The first and second cross mains are disposed proximate a respective one of the first and second end of the array on a second horizontal plane spaced at approximately 28 inches from the first plane. Each of the cross-mains has an internal diameter of approximately 4 inches and connected to each other by a first connection pipe proximate the first end of the array and by a second connection pipe proximate the second end of the array. The first and second connection pipes have an internal diameter of approximately 4 inches and being elevated above the cross main by approximately 10 inches between a centerline of each of the cross mains to a centerline of each of the connection pipes. Each of the connection pipes has a butterfly valve with a flow coefficient of approximately 630 $gpm/psig^{1/2}$ at each location where the connection pipes are connected to the cross mains. The butterfly valves permit fluid to flow through the connection pipes. Each of the first and second cross mains are connected at a lower surface of the cross main with first, second and third drain pipes of approximately 2 inches in diameter disposed generally perpendicular to the floor. The drain pipes have a first through third respective ball valves bv1 and bv2, each with an internal diameter of approximately 2 inches with a flow coefficient of approximately 120 gallons per minute flow per a square root of flow pressure in pound per square inch gauge ($gpm/psig^{1/2}$). Each of the ball valves was connected to the drain pipes at a location nearest the floor. For drainage purposes the midpoints of all the branch pipes were made 4 in. higher than the risers. The two cross-mains were connected with two loop mains of the same diameters as the cross mains. Loop mains pipes connect to a Near the Main where System Riser was connected and a Far Main, which runs parallel to Near Main on the other side of branch pipes. Loop mains were elevated above the cross mains by 10 in., as measured from the loop main pipe centerline to cross main pipe centerline. A butterfly valve was installed at each end of the loop mains. The K-factor of the butterfly valve BV was 630 $gpm/psi^{1/2}$. The length of the pipe from the bottom of the cross-mains to the center of the ball valve for the drain pipe near the north-west corner was 10 in. and all others were about 8 ft. Directly over each drain pipe, a section of 1 ft 6 in. long, 2 in. pipe was welded vertically to the top surface of the cross-main. Another piece of 11-in. long 2-in. pipe was connected from above to the 1 ft 6 in. long pipe via a 2-in. ball valve BV. Although the layout provides for exhauster connected to the top of each of the 11-in. long pipes, the exhausters were not modeled by the preferred embodiment. Otherwise, the ball valves above the 1 ft 6 in. long pipes were closed. The system riser R was positioned near the midpoint of the west cross-main. A 4 in. Schedule 10 pipe was used for the system riser.

A plurality of branch line risers connects the first cross main CM1 and the second cross main CM2 to each of the branch pipes. Each of the plurality of branch line risers being connected to the branch line at a position approximately 4 inches lower than a midpoint of each of the branch pipes, and each of the plurality of branch line risers includes a ball valve having an internal diameter of approximately 1.25 inches with a flow coefficient of approximately 120 gpm/ psig$^{1/2}$, which was located approximately 14 inches above a top surface of each of the cross-mains CM1 and CM2.

A plurality of upright Central® GB ½ inches sprinkler heads with a K factor of 5.6 gpm/psig$^{1/2}$ was connected to each of the plurality of branch pipes. The sprinkler heads are spaced apart from each other at a distance of approximately 9 feet and 4.5 inches on center to center of the sprinkler heads. A sidewall type sprinkler head functions as a "test" sprinkler. The sidewall test sprinkler head has a K factor of 5.6 gpm/psig$^{1/2}$ and can be placed at the most remote hydraulic location in the system.

The test sprinkler head was connected to a 1.25-inch by 0.5-inch by 0.5 inch reduction Tee with a length of 2.7 inches. The Tee was connected at one end to a Setra Model 205-2 gauge and connected at the second end to a 1.25 inch nipple Schedule 40 with a length of 2.2 inches. The 1.25-inch nipple was connected to a 1.25-inch ASCO® solenoid valve with a length of 3.8 inches on a horizontal plane. The solenoid valve was connected to a 1.25-inch adapter nipple Schedule 40 with a horizontal length of 3.7 inches. The adapter nipple was connected to a first 1.25-inch Victaulic® Style 77 coupling. The Style 77 coupling was connected to a Victaulic® No. 10 90-degree elbow. The elbow was connected to a second 1.25-inch Victaulic® Style 77 coupling and spaced horizontally from the first 1.25-inch coupling by a distance of about 2.8 inches. The second 1.25 inch coupling was connected to the first branch line.

The fluid supply includes a pump that provides a plurality of different water flow rate (in gallons per minute or "gpm") according to one of at least three pressure to flow rate curves ("pressure-flow curves") A, B, and C. The first pressure-flow curve A can be defined as a cartesian plot connecting nine points on the plot. The first point has values of approximately 107 psig to 200 gpm; the second point of approximately 99 psig to 400 gpm; third point of approximately 92 psig to 600 gpm; fourth point of approximately 82 psig to 800 gpm; fifth point of approximately 72 psig to 1000 gpm; sixth point of approximately 63 psig to 1200 gpm; seventh point of approximately 48 psig to 1400 gpm; eight point of approximately 28 psig to 1600 gpm, ninth point of approximately 6 psig to 1730 gpm. The second pressure-flow rate curve B can be defined as a cartesian plot connecting seven points on the plot that include a first point of approximately 87 psig to 200 gpm, second point of approximately 63 psig to 400 gpm, third point of approximately 58 psig to 600 gpm, fourth point of approximately 50 psig to 800 gpm, fifth point of approximately 40 psig to 1000 gpm, sixth point of approximately 26 psig to 1200 gpm, seventh point of approximately 8 psig to 1400 gpm. The third pressure-flow rate curve C can be defined as a cartesian plot connecting five points including a first point of approximately 41 psig to 200 gpm, second point of approximately 37 psig to 400 gpm, third point of approximately 32 psig to 600 gpm, fourth point of approximately 24 psig to 800 gpm, fifth point of approximately 13 psig to 1000 gpm.

The base system includes first and second risers R1 and R2. Each of the risers R1, R2 includes an 8-inch Tee No. 20 Victaulic® connected to an 8-inch diameter Schedule 10 pipe oriented generally perpendicular to the floor via an 8-inch coupling style 77 Victaulic®. The 8-inch pipe was connected to a 8"×6" concentric reducer No. 50 Victaulic® via an 8-inch coupling style 77 Victaulic® and a 6-inch coupling style 77 Victaulic®. The concentric reducer was connected to a 6-inch Model 90 check valve Central®. The check valve was connected to a 6-inch grooved butterfly valve Mech-Line® via two 6-inch couplings style 77 Victaulic®. The butterfly valve was connected to a 6-inch Tee No. 20 Victaulic® via two 6-inch couplings style 77 Victaulic®. The 6-inch Tee was connected to a second 6-inch Tee No. 20 Victaulic® via a 6-inch couplings style 77 Victaulic®. The 6-inch Tee was also connected to a 6" to 4" concentric reducer No. 50 Victaulic® via a 6-inch coupling style 77 Victaulic® and a 4-inch coupling style 77 Victaulic®. The second 6-inch Tee was connected to a supply pipe and spaced at a distance of approximately 126 inches from the centerline of the supply pipe to the center line of the 8-inch Tee. The reducer was connected first to a 4-inch Tee No. 20 Victaulic® and second to a Setra/Gauge assembly. The 4-inch Tee was connected to a 4-inch grooved butterfly valve Mech-Line® via two 4-inch couplings style 77 Victaulic®. The 4-inch butterfly valve was connected to a 4-inch Model 90 check valve Central®. The 4-inch check valve was connected a 4-inch Schedule 10 pipe having a length of approximately 97.1 inches oriented generally perpendicular to the floor.

A dry pipe valve with a pressure differential of 5.5 was disposed in fluid communication with the fluid supply and connected to at least one of the first and second risers. As is known, the dry pipe valve can be configured in a closed position to prevent fluid communication between the water supply and the riser and in an open position (i.e., a "tripped" position) to permit fluid communication between the water supply and the riser. Finally, each of the test systems was initially filled with pressurized gas prior to the dry pipe valve being tripped.

Referring to FIG. 1, which shows a wire frame isometric representation of the configuration of the first referential tree system using a 4-inch riser in combination with the base tree type system (hereafter "Tree A4") is shown. In Tree A4, the test sprinkler head SH is located on branch line $b_6$.

Figure 4A:
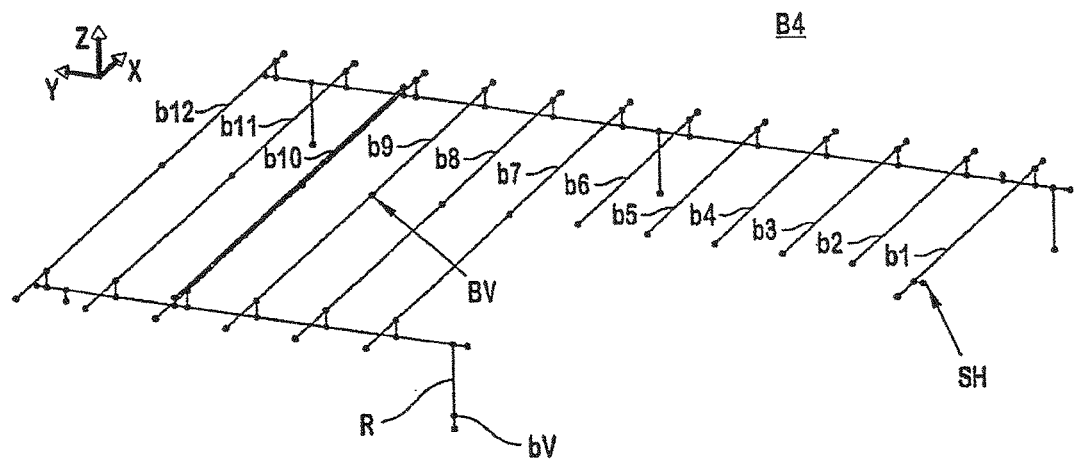
FIG. 4A illustrate a second referential model that can be used to verify the results of the computer-modeling program.

Referring to FIG. 4A, which shows a wire frame isometric representation of the configuration of the second referential tree system using a 4-inch riser in combination with the base tree type system (hereafter "Tree B4") is shown. In Tree B4, half of the branch pipes $b_1$-$b_6$ are not connected to cross main CM1 and the test sprinkler head SH is located at branch line $b_1$.

Figure 4B:
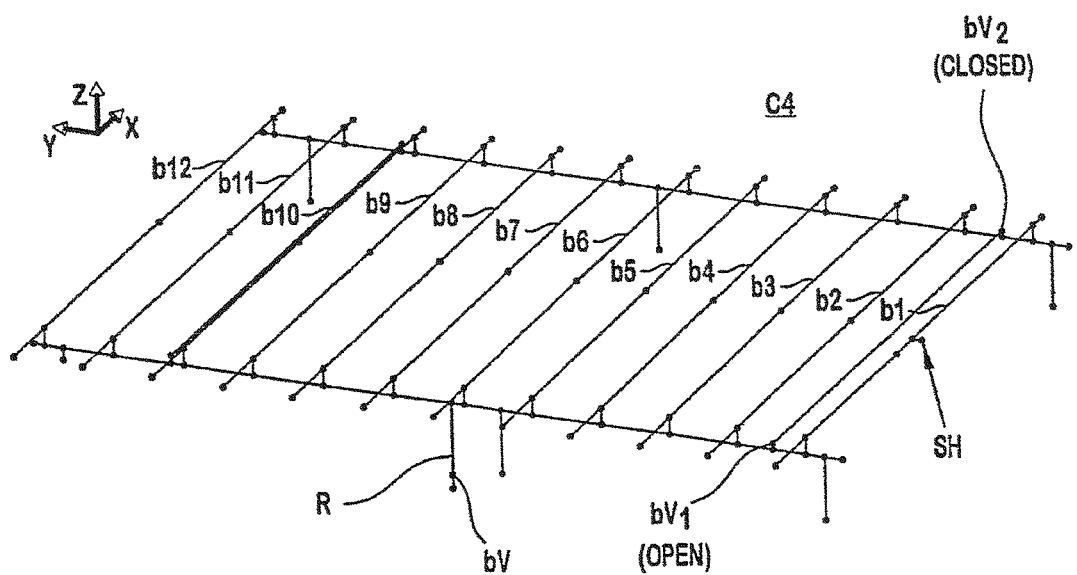
FIG. 4B illustrates a third referential model that can be used to verify the results of the computer-modeling program.

Referring to FIG. 4B, a wire frame isometric representation of the configuration of the third referential tree system using a 4-inch riser in combination with the base tree type system (hereafter "Tree C4") is shown. In Tree C4, all of the branch pipes $b_1$-$b_{12}$ are connected to cross-mains $CM_1$ and $CM_2$ while the test sprinkler head is located at branch line $b_1$. The butterfly valve $bv_1$ is closed while the butterfly valve $bv_2$ is opened.

Figure 4C:
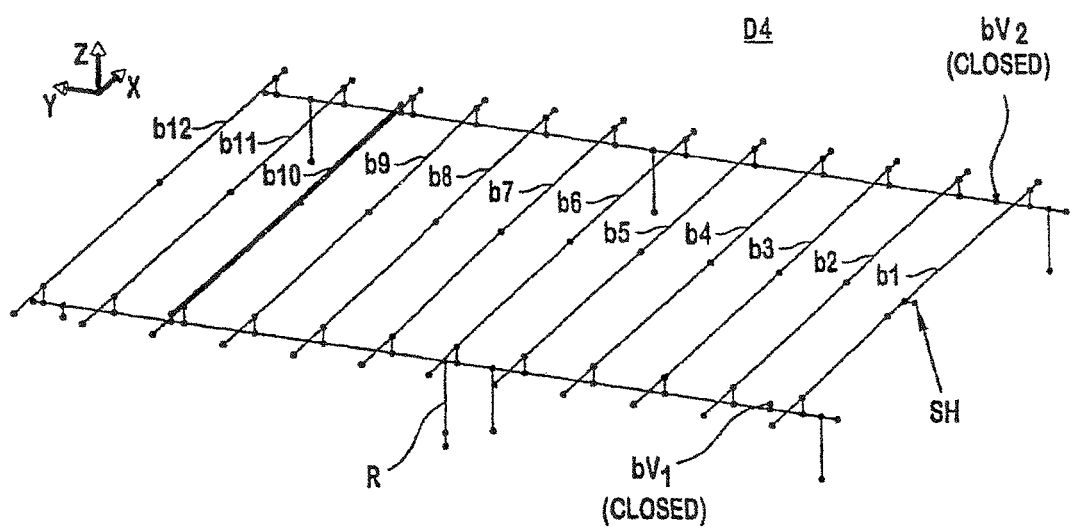
FIG. 4C illustrates a fourth referential model that can be used to verify the results of the computer-modeling program.

Referring to FIG. 4C, which shows a wire frame isometric representation of the configuration of the fourth referential tree system using a 4-inch riser in combination with the base tree type system (hereafter "Tree D4") is shown. In Tree C4, all of the branch pipes $b_1$-$b_{12}$ are connected to cross-mains CM1 and CM2 while the test sprinkler head is located at branch line $b_1$. Both of the butterfly valves $bv_1$ and $bv_2$ are closed.

Tables 3A and 4A compare, respectively, the predicated vs. test values for the dry pipe valve trip time and transit or fluid delay time. The transit time is defined as the sum of the dry pipe valve trip time and transient time. The test data consisted of recorded transit times and dry pipe valve trip times for the test cases described above, where transit and dry pipe valve trip times were typically recorded for three initial system pressures and associated trip pressures (Appendix D). Numerical predictions were derived using both the FLOWCALC and PIPEFLOW computational engine.

Referring to Table 3A, model vs. test dry pipe valve trip times are shown for initial pressures ranging from 10 to 35 psig for the A4, B4 and C4 test cases. As shown in columns 6 and 8, seven out of the ten cases modeled by PIPEFLOW were within 1 sec of the experimental time and all ten cases modeled by FLOWCALC were within 1 sec of the experimental time.

TABLE 3A

Dry pipe valve trip time of Model to Measured Data

| Systems | Trip Pressure (psig) | Initial Pressure (psig) | Measured Trip Time, (seconds) | PIPEFLOW Model Trip Time, (seconds) | Percent to Measured | FlowCalc Model Trip Time, (seconds) | Percent to Measured |
|---|---|---|---|---|---|---|---|
| Tree A4 | 5 | 10 | 20 | 21.06 | 105% | 20.63 | 103% |
| Tree A4 | 15 | 20 | 14 | 14.61 | 104% | 13.5 | 96% |
| Tree A4 | 30 | 35 | 9 | 9.27 | 103% | 9.21 | 102% |
| Tree B4 | 5 | 10 | 13 | 14.35 | 110% | 13.93 | 107% |
| Tree B4 | 30 | 35 | 6 | 6.39 | 107% | 6.21 | 104% |
| Tree C4 | 5 | 10 | 18 | 17.97 | 100% | 17.45 | 97% |
| Tree C4 | 30 | 35 | 8 | 8 | 100% | 7.77 | 97% |

As shown in Table 3B, the absolute value of the highest percent deviation or error is 10% or less. And as used herein, the term "percent deviation" or "error" is determined by subtracting the measured value from the computed data generated by the computer program, dividing the result and multiplying the result by 100.

TABLE 3B

Percent Error Between Measured Data and Modeled Data

| Systems | Measured Trip Time, (seconds) | PIPEFLOW Model Trip Time, (seconds) | Measured v. PIPEFLOW Percent Error | FlowCalc Model Trip Time, (seconds) | Measured v. FlowCalc Percent Error |
|---|---|---|---|---|---|
| Tree A4 | 20 | 21.06 | 5% | 20.63 | -3% |
| Tree A4 | 14 | 14.61 | 4% | 13.5 | -4% |
| Tree A4 | 9 | 9.27 | 3% | 9.21 | -2% |
| Tree B4 | 13 | 14.35 | 10% | 13.93 | -7% |
| Tree B4 | 6 | 6.39 | 7% | 6.21 | -4% |
| Tree C4 | 18 | 17.97 | 0% | 17.45 | -3% |
| Tree C4 | 8 | 8 | 0% | 7.77 | -3% |

Referring to Table 4A, model vs. test transit or fluid delivery times are shown for 5, 15 and 30 psig trip pressures (and corresponding initial gas pressures) and for pressure profiles A, B and C as a function of the flow rate at the tank/dry pipe valve. Column 1 indicates the test case for each experiment. Referring to columns 6-8, PIPEFLOW predicts a transit flow time that was less then the measured time (maximum deviation from experimental data was about 10%). Referring to Columns 8-10, FLOWCALC predicts a transit flow time that was more then the measured time (maximum deviation from experimental data was about 13%).

TABLE 4A

Transit Time of Model to Measured Data

| Systems | Trip Pressure (psig) | Initial Pressure (psig) | Fluid Supply Pressure (psig) | Supply v. Flow Rate Curve A, B, or C (from FIG. 10 of FMRC Report) | Measured Transit Time, (seconds) | PipeFlow Transit Time, (seconds) | Percent to Measured | FlowCalc Transit time, (seconds) | Percent to Measured |
|---|---|---|---|---|---|---|---|---|---|
| Tree A4 | 5 | 10 | 45 | C | 35 | 33.82 | 97% | 38.6 | 110% |
| Tree A4 | 15 | 20 | 45 | C | 43 | 40.88 | 95% | 44.5 | 103% |
| Tree A4 | 30 | 35 | 45 | C | 58 | 53.28 | 92% | 58.4 | 101% |
| Tree A4 | 5 | 10 | 72 | B | 27 | 25.98 | 96% | 30.3 | 112% |
| Tree A4 | 15 | 20 | 72 | B | 31 | 29.44 | 95% | 33.2 | 107% |
| Tree A4 | 30 | 35 | 72 | B | 37 | 36.87 | 100% | 39.9 | 108% |
| Tree A4 | 5 | 10 | 111 | A | 22 | 21.55 | 98% | 24.75 | 113% |
| Tree A4 | 15 | 20 | 111 | A | 24 | 22.96 | 96% | 26.3 | 110% |
| Tree A4 | 30 | 35 | 111 | A | 27 | 26.43 | 98% | 29.7 | 110% |
| Tree B4 | 5 | 10 | 72 | B | 17 | 15.91 | 94% | 18.7 | 110% |
| Tree B4 | 30 | 35 | 72 | B | 24 | 22.55 | 94% | 24.8 | 103% |
| Tree C4 | 5 | 10 | 72 | B | 19 | 17.17 | 90% | 20.65 | 109% |
| Tree C4 | 30 | 35 | 72 | B | 24 | 23.67 | 99% | 25.7 | 107% |
| Tree D4 | 5 | 10 | 72 | B | 20 | 19.54 | 98% | 22.3 | 112% |
| Tree D4 | 30 | 35 | 72 | B | 25 | 24.5 | 98% | 26.5 | 106% |

From the data generated in Table 4A, the percent deviation or error of each of the computational engines is shown for each of the actual referential cases. For both computational engines, the percent deviation is less than 20% for transit time. In particular, for the PipeFlow computational engine, the absolute value of percent deviation is 10% or less for transit time and for the FlowCalc computational engine, the absolute value of percent deviation is 12% or less for transit time, shown here in Table 4B.

TABLE 4B

Percent Error Between Measured Data and Modeled Data

| Systems | Measured Transit Time, (seconds) | PipeFlow Model Transit Time, (seconds) | Measured v. PipeFlow Percent Error | FlowCalc Model Transit Time, (seconds) | Measured v. FlowCalc Percent Error |
| --- | --- | --- | --- | --- | --- |
| A4 | 35 | 33.82 | −3% | 38.6 | 10% |
| A4 | 43 | 40.88 | −5% | 44.5 | 3% |
| A4 | 58 | 53.28 | −8% | 58.4 | 1% |
| A4 | 27 | 25.98 | −4% | 30.3 | 12% |
| A4 | 31 | 29.44 | −5% | 33.2 | 7% |
| A4 | 37 | 36.87 | 0% | 39.9 | 8% |
| A4 | 22 | 21.55 | −2% | 24.75 | 13% |
| A4 | 24 | 22.96 | −4% | 26.3 | 10% |
| A4 | 27 | 26.43 | −2% | 29.7 | 10% |
| B4 | 17 | 15.91 | −6% | 18.7 | 10% |
| B4 | 24 | 22.55 | −6% | 24.8 | 3% |
| C4 | 19 | 17.17 | −10% | 20.65 | 9% |
| C4 | 24 | 23.67 | −1% | 25.7 | 7% |
| D4 | 20 | 19.54 | −2% | 22.3 | 12% |
| D4 | 25 | 24.5 | −2% | 26.5 | 6% |

Thus, the preferred embodiments allow a user to predict trip and liquid delivery time parameters of a model of an arbitrary design (e.g., prototype or existing) of a tree type piping system topology with a high degree of correlation (i.e., less than ±20%) based on the above comparisons between known dry pipe systems (e.g., systems A, B, C, and D) and the predicted parameters by the preferred embodiments of these known systems.

Moreover, the preferred embodiments can be used to (a) to install a dry pipe system with a capacity greater than 500 gallons without a quick opening device and without having to actually test such dry pipe system to determine whether the system will deliver water to a sprinkler in less than 60 seconds; (b) to verify whether an existing dry pipe system of between 501 to 750 gallons would deliver fluid within a desired time duration when local flow conditions are accounted for and when the use of a quick opening device is eliminated; and (c) to modify existing system to pass these tests based on modifications to the existing system design without having to actually test the system with the modifications. These results in the competitive advantage in that the capital outlay for an accurate and verifiable computer modeling would be lower than the cost of physical testing.

The method includes an arbitrary design of a dry pipe fire protection sprinkler system design (with the appropriate size risers, e.g., 4-inch or 8-inch) with a design system capacity of greater than 500 gallons of fluid that does not rely on a quick opening device. The design is converted into a mathematical model by at least one of the preferred embodiments of the computer program. The computer program would predict a liquid delivery time (i.e., trip time and transit time) between an actuation of a dry pipe valve and delivery of fluid at a sprinkler head. That is, the computer program can model the physical attributes of the pipe design as nodes and pipes where the attributes of the nodes represent at least a point of transition from one pipe size to another, elbows or bends, tees and laterals for dividing or mixing streams and valves, and exit opening or nozzles, and the attributes of the pipes represent at least a type, size, material, C-factor, and absolute roughness of the pipes. Further, the computer can estimate a time duration for gas pressure in the network to drop below a threshold pressure when the gas is permitted to escape from the network through an open node in the network, approximate a time duration for a fluid front to travel from an initial location in the network to the open node, and determine an approximation of the pressure of the fluid over time as the fluid front travels from the initial location to the open node. If the predicted transit time for the design is less than sixty seconds or any desired threshold value, the computer program can be used to adjust the physical attributes of the design by the user so that the predicted transit duration conforms to a desired duration. When the predicted transition time is within a desired duration (e.g., sixty, fifty, forty five, forty or fifteen seconds depending on the type of hazard classified under NFPA 13 (2002)) and within an acceptable error rate, the design would then be implemented by an actual construction of dry pipe fire sprinkler system based on the design without any necessity for actual testing certification.

The process is also applicable to retrofitting an existing dry pipe sprinkler system of greater than 500 gallons and less than 750 gallons capacity to account, for example, to local operating parameters (e.g., pressure, flow), fire pump or to eliminate some components such as, for example, a dry pipe valve accelerator. For example, in the latter case, the existing system would be modeled without the accelerator to determine whether the modeled system would be capable of delivering fluid to a minimum number of hydraulically remote sprinkler(s) at a suitable threshold such as, for example, fifteen seconds or less with one opened sprinkler for residential applications; forty seconds or less with four opened sprinklers for high-piled storage applications; forty-five seconds or less with four opened sprinklers for extra hazard; fifty seconds or less with two opened sprinklers for ordinary storage; and sixty seconds or less with one opened sprinkler for light hazard applications.

Where the model of the existing system would indicate, via the program, that the existing system would fail the test, the user would have an opportunity to modify the model by taking into account local conditions such as, for example, increased pressure and flow rate or the user could modify other parameters of the system to permit the model of the existing to comply with the test. Furthermore, by using the preferred embodiments of the program, individuals would be able to determine with a reasonable degree of certainty whether existing systems would pass the transit time test.

The advantages of the preferred embodiments are numerous. Individuals employing the dry pipe sprinkler system are now capable of maximizing the system size based on the available water supply and the geometry of the building to be protected. The preferred embodiments would allow the individuals to examine various options for conformance with installation requirement such as, for example, NFPA 13 (2002 Ed.) prior to establishing a final design and procuring components for the project. In addition, final calculations would confirm the ability of the system to provide water to most remote portion of the sprinkler system within a suitable time. This would eliminate the time, expense, and downsides of actual testing.

While the present invention has been disclosed with reference to certain embodiments, numerous modifications, alterations and changes to the described embodiments are

What we claim is:

1. A non-transitory computer readable medium encoded with a computer program to evaluate fluid flow performance of an arbitrary dry pipe fire protection system without a physical test of the actual system, the computer program causing a computer processor to perform:
configuring a user interface for entry of a plurality of physical attributes of the dry pipe fire protection system having a plurality of pipe segments and a plurality of piping connections including a dry pipe valve and a plurality of sprinkler heads connecting the plurality of pipe segments so as to define a system capacity greater than 500 gallons;
generating, in connection with the computer processor and based on the physical attributes, a line-node-model of the dry pipe fire protection system including a plurality of lines and a plurality of nodes, the lines characterizing the plurality of pipe segments and the nodes characterizing the plurality of piping connections, the model having a closed configuration in which a gas fills the pipe segments to hold the dry pipe valve in a closed position, and the model having an open configuration in which at least one hydraulically remote sprinkler head is open such that gas escapes the system;
solving, in conjunction with at least one of a first computational engine and a second computational engine, for transient flow or pressure in the operation of the dry pipe fire protection system from the closed configuration to the open configuration and the characteristics of pressure and flow of gas and liquid in each pipe segment of the arbitrary dry pipe fire protection system defining the capacity greater than 500 gallons; and
determining, in conjunction with the at least one of the first computational engine and the second computational engine, a time duration for any one of: (i) gas pressure to drop below a threshold pressure to operate the dry pipe valve from the closed position to an open position to permit liquid from a liquid source to fill the pipe segments; (ii) liquid to travel from the liquid source to the at least one open hydraulically remote sprinkler; or (iii) liquid traveling from the liquid source to the at least one open hydraulically remote sprinkler to reach a steady state flow or pressure condition;
indicating, based upon the time duration, whether the arbitrary dry pipe fire protection system will deliver liquid to the at least one hydraulically remote sprinkler in the system within a threshold time; and
modifying the physical attributes of the arbitrary dry pipe fire protection system in the model so that the liquid is delivered to the at least one hydraulically remote sprinkler within the threshold time when it is indicated that the system delivers liquid to the at least one hydraulically remote sprinkler in a time greater than the threshold time.

2. The non-transitory computer readable medium of claim 1, wherein generating the model in the open configuration includes four open sprinklers.

3. The non-transitory computer readable medium of claim 1, wherein generating the model in the open configuration includes the at least one open sprinkler to include consecutive sprinkler activations to define sequential fluid deliveries.

4. The non-transitory computer readable medium of claim 1, wherein the generating a line-node-model includes modeling the fire protection system with loops in the plurality of pipe segments, a pump, a backflow preventer and a valve opening accelerator.

5. The non-transitory computer readable medium of claim 1, wherein the solving includes: (i) solving a system of energy equations that define a liquid flow front in the model including gas flow and pressure interaction upon the liquid front; and (ii) solving a system of momentum balance equations of transient flow of liquid, gas or liquid-gas mixture in the entire piping system for the entire period of transient flow of liquid.

6. The non-transitory computer readable medium of claim 1, wherein the plurality of piping connections includes: (i) points of transition from one pipe segment size to another; (ii) elbows; (iii) tees; (iv) laterals for dividing or mixing streams of fluid; (v) valves including a dry pipe valve; and (vi) a plurality of exits including a plurality of sprinkler heads, the physical attributes including: (a) a total number of the sprinkler heads in the system; (b) a total number of branch pipes of the pipe segments in the system; (c) total coverage area of the system; (d) a number of the sprinkler heads relative to a feed main of the pipe segments; (e) location and length of the feed main; (f) elevation and/or location of the plurality of sprinkler heads and pipe segments; (g) K-factor of each of the sprinkler heads; (h) orifice diameter of each of the sprinkler heads; (i) minimum operating pressure of each of the sprinkler heads; (j) other pipe segments including cross-mains or drops; (k) pipe segment physical attributes including pipe schedule, pipe size, internal diameter, Hazen-Williams C-Factor, absolute roughness, length, fittings, equivalent length, and total length; and (l) a liquid supply source.

7. The non-transitory computer readable medium of claim 1, wherein the first computational engine is based on energy equations for liquid and temperature relaxation equations for a moving gas which solves the equations of motion in the vicinity of a flow front for each pipe segment having a flow front of liquid with gas either entrapped or depleted to impose pressure on the flow front at any point in time to express the state of the fluid for each pipe segment having a flow front at two endpoints being the flow front and the nearest node upstream of the flow front; and
the second computational engine is based on momentum balance equations for a gas, liquid or gas-liquid mix control volume in each of the pipe segments of the system, the second computational engine solving the equations of motion for each pipe in the system during an entire transient flow period to determine position of a flow front of liquid and entrapped gas volumes for each of the pipe segments, the second computational engine determining the mass flow rate in each pipe segment and pressure at each node.

8. The non-transitory computer readable medium of claim 1, wherein configuring the user interface provides for user adjustment of the physical attributes if the time duration or steady state pressure condition do not conform to a threshold value.

9. The non-transitory computer readable medium of claim 1, further comprising displaying the generated line-node-model in the user interface.

10. A non-transitory computer readable medium encoded with a computer program to evaluate fluid flow performance of an arbitrary dry pipe fire protection system having a capacity ranging from greater than 500 gallons to 750 gallons without a physical test of the actual system, the computer program causing a computer processor to perform:

configuring a user interface for entry of a plurality of physical attributes of the dry pipe fire protection system having a plurality of pipe segments and a plurality of piping connections connecting the plurality of pipe segments;

generating, in connection with the computer processor and based on the physical attributes, a line-node-model of the dry pipe fire protection system including a plurality of lines and a plurality of nodes, the lines characterizing the plurality of pipe segments and the nodes characterizing the plurality of piping connections;

solving, in conjunction with at least one of a first computational engine and a second computational engine, for transient flow or pressure in the dry pipe fire protection system upon operation of a minimum number of hydraulically remote sprinklers as including a number of open sprinklers of no more than four open sprinklers, each of the open sprinklers being defined by an operating time;

determining, in conjunction with the at least one of the first computational engine and the second computational engine, time based characteristics of pressure and flow in each pipe segment of the fire protection system defining the system capacity ranging from greater than 500 gallons to 750 gallons and whether the system will deliver liquid from the liquid source to one of the open sprinklers within a threshold transit duration, the threshold transit duration being 60 seconds or less; and modify the physical attributes of the dry pipe fire protection system in the model so that the liquid is delivered to one of the open sprinklers within the threshold transit duration when it is determined that the system delivers liquid to the one of the open sprinklers in a time greater than the threshold transit duration.

11. The non-transitory computer readable medium of claim 10, wherein the determining includes determining whether the system will deliver the liquid to the one open sprinkler in less than the threshold transit duration without a quick opening device.

12. The non-transitory computer readable medium of claim 10, wherein the determining includes determining any one of a trip time, a transient time and an operating time.

13. The non-transitory computer readable medium of claim 10, wherein the threshold transit duration is any one of fifty, forty-five, forty or fifteen seconds.

14. The non-transitory computer readable medium of claim 10, wherein the threshold transit duration is any one of:
(a) fifteen seconds or less for residential hazard, the number of open sprinklers being one;
(b) forty seconds or less for high-piled storage, the number of open sprinklers being four;
(c) forty-five seconds or less for extra hazard, the number of open sprinklers being four;
(d) fifty seconds or less for ordinary storage, the number of open sprinklers being two; or
(e) sixty seconds or less for light hazard applications, the number of open sprinklers being one.

15. The non-transitory computer readable medium of claim 10, wherein the solving includes: (i) solving a system of energy equations that define a liquid flow front in the model including gas flow and pressure interaction upon the liquid front; and (ii) solving a system of momentum balance equations of transient flow of liquid, gas or liquid-gas mixture in the entire piping system for the entire period of transient flow of liquid.

16. The non-transitory computer readable medium of claim 10, wherein the physical attributes, piping segments and piping connections include: a liquid source defined by at least one of a flow and pressure; a tree network of pipes for coupling to the liquid source, the network having an initial gas pressure and at least one of a feed main, a cross main, a riser nipple, a branch line, a drop and a sprig, the network further being defined by at least one of a: pipe schedule, size, internal diameter, Hazen-Williams C-Factor, absolute roughness, length, fittings, equivalent length, and total length; an automatic control valve located between the liquid source and the network, the control valve being defined by a trip ratio; a plurality of sprinklers spaced throughout the network, the plurality of sprinklers including a minimum number of hydraulically remote sprinklers from the control valve, each of the plurality of sprinklers being defined by at least one of a: coverage area, K-factor, orifice diameter, minimum operating pressure, orientation, and elevation.

17. The non-transitory computer readable medium of claim 10, wherein the first computational engine is based on energy equations for liquid and temperature relaxation equations for a moving gas which solves the equations of motion in the vicinity of a flow front for each pipe segment having a flow front of liquid with gas either entrapped or depleted to impose pressure on the flow front at any point in time to express the state of the fluid for each pipe segment having a flow front at two endpoints being the flow front and the nearest node upstream of the flow front; and the second computational engine is based on momentum balance equations for a gas, liquid or gas-liquid mix control volume in each of the pipe segments of the system, the second computational engine solving the equations of motion for each pipe in the system during an entire transient flow period to determine positon of a flow front of liquid and entrapped gas volumes for each of the pipe segments, the second computational engine determining the mass flow rate in each pipe segment and pressure at each node.

18. The non-transitory computer readable medium of claim 10, wherein configuring the user interface provides for user adjustment of the physical attributes if the time to deliver liquid from the liquid source to one of the open sprinklers is not less than the threshold transit duration.

19. The non-transitory computer readable medium of claim 10, further comprising displaying the generated line-node-model in the user interface.

* * * * *